US010448424B2

(12) United States Patent
Ngo et al.

(10) Patent No.: US 10,448,424 B2
(45) Date of Patent: *Oct. 15, 2019

(54) METHOD AND APPARATUS FOR USE OF SIMULTANEOUS MULTIPLE CHANNELS IN THE DYNAMIC FREQUENCY SELECTION BAND IN WIRELESS NETWORKS

(71) Applicant: NETWORK PERFORMANCE RESEARCH GROUP LLC, Campbell, CA (US)

(72) Inventors: Terry F K Ngo, Bellevue, WA (US); Seung Baek Yi, Brentwood, TN (US); Erick Kurniawan, San Francisco, CA (US); Kun Ting Tsai, Fremont, CA (US)

(73) Assignee: NETWORK PERFORMANCE RESEARCH GROUP LLC, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,900

(22) Filed: Oct. 11, 2017

(65) Prior Publication Data

US 2018/0035457 A1 Feb. 1, 2018

Related U.S. Application Data

(63) Continuation of application No. 14/920,568, filed on Oct. 22, 2015, now Pat. No. 9,832,791.
(Continued)

(51) Int. Cl.
*H04W 74/00* (2009.01)
*H04W 16/14* (2009.01)
(Continued)

(52) U.S. Cl.
CPC .......... *H04W 74/006* (2013.01); *H04B 17/30* (2015.01); *H04W 16/14* (2013.01);
(Continued)

(58) Field of Classification Search
CPC ........ H04B 17/30; H04B 1/1027; H04B 1/38; H04B 1/7183; H04W 16/14; H04W 24/08;
(Continued)

(56) References Cited

U.S. PATENT DOCUMENTS 5,978,669 A 11/1999 Sanmugam
6,181,952 B1 1/2001 Murata
(Continued)

FOREIGN PATENT DOCUMENTS

EP 2512169 A1 10/2012
EP 1925108 B1 3/2014
(Continued)

OTHER PUBLICATIONS

Office Action for Japanese Application No. 2016-153596 dated Dec. 12, 2017, 7 pages.
(Continued)

*Primary Examiner* — Alejandro Rivero
*Assistant Examiner* — Paul P Tran
(74) *Attorney, Agent, or Firm* — Amin, Turocy & Watson, LLP

(57) ABSTRACT

The present invention relates to wireless networks and more specifically to systems and methods for selecting available channels free of radar signals from a plurality of 5 GHz radio frequency channels. In one embodiment, the present invention provides a standalone multi-channel DFS master that includes a switch and embedded processor that are programmed to switch a 5 GHz radio transceiver to a first channel of the plurality of 5 GHz radio channels, cause a
(Continued)

beacon generator to generate a beacon in the first channel of the plurality of 5 GHz radio channels, cause a radar detector to scan for the radar signal in the first channel of the plurality of 5 GHz radio channel, and then repeat these steps for each of the other channels of the plurality of 5 GHz radio channels during a single beacon transmission duty cycle.

20 Claims, 13 Drawing Sheets

Related U.S. Application Data

(60) Provisional application No. 62/200,764, filed on Aug. 4, 2015.

(51) Int. Cl.
  *H04B 17/30* (2015.01)
  *H04W 84/12* (2009.01)
  *H04W 48/08* (2009.01)
  *H04W 88/06* (2009.01)

(52) U.S. Cl.
  CPC ............ *H04W 48/08* (2013.01); *H04W 84/12* (2013.01); *H04W 88/06* (2013.01)

(58) Field of Classification Search
  CPC . H04W 36/18; H04W 48/08; H04W 72/0453; H04W 74/006; H04W 74/0808; H04W 84/12; H04W 88/06; H04W 88/08; H04W 16/02; H04W 16/10; H04W 24/02; H04W 24/04; H04W 24/10; H04W 28/18; H04W 36/06; H04W 36/36; H04W 40/244; H04W 48/02; H04W 48/04; H04W 48/10; H04W 48/16; H04W 48/20; H04W 72/005; H04W 72/02; H04W 72/0406; H04W 72/042; H04W 72/0446; H04W 72/085; H04W 74/002; H04W 76/023; H04W 76/15; G01S 7/021; G01S 7/022; G01S 7/023; G08G 1/09675; G08G 1/096775; H04K 3/224; H04K 3/226; H04K 3/822; H04L 1/22; H04L 5/0062; H04L 5/06; H04L 43/045; H04L 43/12; H04L 47/2416; H04L 63/162; H04L 65/4069; H04L 67/104; H04L 67/2861; H04N 21/43
  See application file for complete search history.

(56) References Cited

U.S. PATENT DOCUMENTS

| | | | |
|---|---|---|---|
| 6,870,815 B2 | 3/2005 | McFarland et al. | |
| 6,882,851 B2* | 4/2005 | Sugar | H04W 16/14 455/113 |
| 7,457,628 B2 | 11/2008 | Blumberg et al. | |
| 7,548,750 B2 | 6/2009 | Kruys et al. | |
| 7,606,193 B2 | 10/2009 | McFarland et al. | |
| 7,813,744 B2 | 10/2010 | Johnson | |
| 8,213,942 B2 | 7/2012 | Likar et al. | |
| 8,239,337 B2 | 8/2012 | Madani | |
| 8,260,357 B2 | 9/2012 | Likar et al. | |
| 8,472,334 B2 | 6/2013 | Likar et al. | |
| 8,483,059 B2 | 7/2013 | Likar et al. | |
| 8,565,106 B2 | 10/2013 | Likar et al. | |
| 8,654,782 B2 | 2/2014 | Meil et al. | |
| 8,699,341 B2 | 4/2014 | Likar et al. | |
| 8,867,490 B1 | 10/2014 | Krishna et al. | |
| 8,879,996 B2 | 11/2014 | Kenney et al. | |
| 8,885,511 B2 | 11/2014 | Likar et al. | |
| 9,060,289 B2 | 6/2015 | Chandrasekhar et al. | |
| 9,066,251 B2 | 6/2015 | Madan et al. | |
| 9,131,391 B2 | 9/2015 | Madan et al. | |
| 9,131,392 B2 | 9/2015 | Madan et al. | |
| 9,131,504 B2 | 9/2015 | Kenney et al. | |
| 9,307,413 B2 | 4/2016 | Lenzini et al. | |
| 9,363,743 B2 | 6/2016 | Xue et al. | |
| 9,439,197 B1 | 9/2016 | Ngo et al. | |
| 9,622,089 B1 | 4/2017 | Ngo et al. | |
| 9,699,786 B2 | 7/2017 | Ngo et al. | |
| 9,807,625 B2 | 10/2017 | Ngo et al. | |
| 9,832,791 B2 | 11/2017 | Ngo et al. | |
| 9,999,055 B2 | 6/2018 | Ngo et al. | |
| 10,104,665 B2 | 10/2018 | Ngo et al. | |
| 2002/0116380 A1 | 8/2002 | Chen et al. | |
| 2003/0107512 A1* | 6/2003 | McFarland | G01S 7/021 342/159 |
| 2003/0181213 A1 | 9/2003 | Sugar et al. | |
| 2004/0033789 A1 | 2/2004 | Tsien | |
| 2004/0146022 A1* | 7/2004 | Lewis | G01S 7/021 370/331 |
| 2004/0151137 A1 | 8/2004 | McFarland et al. | |
| 2004/0156336 A1 | 8/2004 | McFarland et al. | |
| 2004/0242188 A1 | 12/2004 | Uchida et al. | |
| 2005/0059364 A1 | 3/2005 | Hansen et al. | |
| 2005/0192016 A1* | 9/2005 | Zimmermann | H04W 16/14 455/450 |
| 2005/0215266 A1* | 9/2005 | Tsien | H04W 16/14 455/454 |
| 2005/0272435 A1 | 12/2005 | Tsien et al. | |
| 2006/0082489 A1* | 4/2006 | Liu | H04B 17/345 342/52 |
| 2006/0189311 A1* | 8/2006 | Cromer | H04W 48/16 455/434 |
| 2007/0060065 A1* | 3/2007 | Kruys | G01S 7/021 455/67.11 |
| 2007/0126622 A1* | 6/2007 | Nallapureddy | G01S 7/021 342/92 |
| 2008/0016556 A1 | 1/2008 | Selignan | |
| 2008/0049918 A1 | 2/2008 | Heinze et al. | |
| 2008/0075038 A1* | 3/2008 | Jin | H04W 16/14 370/329 |
| 2008/0089280 A1 | 4/2008 | Hu | |
| 2009/0077620 A1 | 3/2009 | Ravi et al. | |
| 2009/0116411 A1 | 5/2009 | Castagnoli et al. | |
| 2009/0146866 A1 | 6/2009 | Matsumoto et al. | |
| 2009/0160696 A1 | 6/2009 | Pare et al. | |
| 2009/0201851 A1 | 8/2009 | Kruys et al. | |
| 2010/0061289 A1 | 3/2010 | Mun et al. | |
| 2010/0216480 A1 | 8/2010 | Park et al. | |
| 2010/0271948 A1 | 10/2010 | Challapali et al. | |
| 2010/0302966 A1 | 12/2010 | Matsuura | |
| 2011/0126110 A1 | 5/2011 | Vilke et al. | |
| 2012/0039265 A1 | 2/2012 | Patel et al. | |
| 2012/0258749 A1 | 10/2012 | Lenzini et al. | |
| 2012/0300759 A1 | 11/2012 | Patanapongpibul et al. | |
| 2013/0072106 A1* | 3/2013 | Koskela | H04W 16/14 455/3.01 |
| 2013/0171941 A1* | 7/2013 | Kenney | H04W 76/14 455/62 |
| 2013/0201928 A1 | 8/2013 | Kim et al. | |
| 2013/0252640 A1 | 9/2013 | Kenney et al. | |
| 2013/0314267 A1 | 11/2013 | Kenney et al. | |
| 2014/0036691 A1 | 2/2014 | Madan et al. | |
| 2014/0059218 A1 | 2/2014 | Ganu et al. | |
| 2014/0171060 A1 | 6/2014 | Cook et al. | |
| 2014/0220964 A1 | 8/2014 | Kurucz, Jr. et al. | |
| 2014/0241226 A1 | 8/2014 | Jia et al. | |
| 2014/0253361 A1 | 9/2014 | Rezk et al. | |
| 2014/0301328 A1 | 10/2014 | Yacovitch | |
| 2014/0328286 A1 | 11/2014 | Crowle et al. | |
| 2014/0349669 A1 | 11/2014 | Qi et al. | |
| 2014/0362782 A1 | 12/2014 | Yuk et al. | |
| 2015/0023271 A1 | 1/2015 | Nakano | |
| 2015/0063321 A1 | 3/2015 | Sadek et al. | |
| 2015/0177720 A1 | 6/2015 | Anderson et al. | |
| 2015/0189528 A1 | 7/2015 | Carbajal | |
| 2015/0208330 A1 | 7/2015 | Park et al. | |
| 2015/0256323 A1 | 9/2015 | Gandarillas et al. | |
| 2015/0263886 A1 | 9/2015 | Wang et al. | |

(56) References Cited

U.S. PATENT DOCUMENTS

| | | | |
|---|---|---|---|
| 2015/0271829 | A1 | 9/2015 | Amini et al. |
| 2016/0014613 | A1 | 1/2016 | Ponnampalam et al. |
| 2016/0044673 | A1 | 2/2016 | Liu et al. |
| 2016/0095108 | A1 | 3/2016 | Ryoo et al. |
| 2016/0157168 | A1 | 6/2016 | Xue et al. |
| 2016/0249357 | A1 | 8/2016 | Green et al. |
| 2016/0261657 | A1 | 9/2016 | Bruhn et al. |
| 2016/0285611 | A1 | 9/2016 | Fischer et al. |
| 2016/0345323 | A1 | 11/2016 | Krishnamoorthy et al. |
| 2017/0026845 | A1* | 1/2017 | Garg ............ H04W 16/10 |
| 2017/0034707 | A1 | 2/2017 | Green et al. |
| 2017/0041949 | A1 | 2/2017 | Ngo et al. |
| 2017/0041954 | A1 | 2/2017 | Tsai et al. |
| 2017/0048728 | A1 | 2/2017 | Ngo et al. |
| 2017/0048864 | A1 | 2/2017 | Ngo et al. |
| 2017/0063665 | A1 | 3/2017 | Casebolt et al. |
| 2017/0079007 | A1 | 3/2017 | Carbajal |
| 2017/0123049 | A1 | 5/2017 | Tsai et al |
| 2017/0142728 | A1 | 5/2017 | Tsai et al. |
| 2017/0156113 | A1 | 6/2017 | Visuri et al. |
| 2017/0188293 | A1* | 6/2017 | Mizusawa ............ H04W 16/14 |
| 2017/0273084 | A1 | 9/2017 | Yi et al. |
| 2017/0290075 | A1 | 10/2017 | Carbajal et al. |
| 2018/0020453 | A1 | 1/2018 | Lin et al. |
| 2018/0059213 | A1 | 3/2018 | Wallstedt et al. |
| 2018/0070253 | A1 | 3/2018 | Kleinbeck et al. |
| 2018/0234974 | A1 | 8/2018 | Ngo et al. |

FOREIGN PATENT DOCUMENTS

| | | |
|---|---|---|
| EP | 3128779 A1 | 2/2017 |
| JP | 2004-535095 A | 11/2004 |
| JP | 2005-523616 A | 8/2005 |
| JP | 2012-120033 A | 6/2012 |
| WO | 2007032790 A2 | 3/2007 |
| WO | 2007032790 A3 | 4/2009 |
| WO | 20140176503 A1 | 10/2014 |
| WO | 2014190004 A1 | 11/2014 |

OTHER PUBLICATIONS

Office Action for U.S. Appl. No. 15/225,966 dated Nov. 7, 2017, 26 pages.
Office Action for U.S. Appl. No. 15/259,386 dated Dec. 18, 2017, 41 pages.
Office Action for U.S. Appl. No. 15/416,568 dated Nov. 17, 2017, 39 pages.
Notice of Allowance for U.S. Appl. No. 15/225,966 dated Jan. 19, 2018, 32 pages.
Office Action for U.S. Appl. No. 15/711,649 dated Jan. 26, 2018, 28 pages.
Japanese Office Action for Japanese Patent Application No. 2016-142261 dated Jan. 16, 2018, 6 pages (with translation).
Notice of Allowance dated Jul. 3, 2017 for U.S. Appl. No. 15/263,985, 28 pages.
Office Action for U.S. Appl. No. 14/920,568, dated Mar. 29, 2016, 29 pages.
Office Action for U.S. Appl. No. 15/085,573, dated Jun. 24, 2016, 15 pages.
Notice of Allowance dated Jul. 19, 2016 for U.S. Appl. No. 15/085,573, 27 pages.
Office Action for U.S. Appl. No. 14/920,568, dated Sep. 30, 2016, 28 pages.
Extended European Search Report for EP Patent Application Serial No. 16182722.5, dated Dec. 15, 2016, 11 pages.
Kerry et al., "Liaison Statement on the Compatibility Between IEEE 802.11a and Radars in the Radiolocation and Radionavigation Service in the 5250-5350 MHz and 5470-5725 MHz bands", Jan. 2001, IEEE, 6 pages.
Extended European Search Report for EP Patent Application Serial No. 16182672.2, dated Dec. 16, 2016, 8 pages.

Office Action for U.S. Appl. No. 15/214,437 dated Jan. 23, 2017, 33 pages.
Office Action for U.S. Appl. No. 14/920,568, dated Jan. 20, 2017, 26 pages.
Extended European Search Report for EP Patent Application Serial No. 16187611.5, dated Jan. 30, 2017, 8 pages.
Office Action for U.S. Appl. No. 15/259,386, dated Jan. 9, 2017, 37 Pages.
Office Action for U.S. Appl. No. 15/171,911, dated Feb. 28, 2017, 34 Pages.
Office Action for U.S. Appl. No. 15/263,985, dated Mar. 7, 2017, 33 Pages.
Notice of Allowance dated Apr. 12, 2017 for U.S. Appl. No. 15/171,911, 30 pages.
European Office Action dated Feb. 13, 2017 for European Application Serial No. 16182722.5, 2 pages.
Office Action for U.S. Appl. No. 15/428,658, dated May 10, 2017, 20 pages.
Office Action for U.S. Appl. No. 15/416,568. dated May 18, 2017, 39 pages.
Extended European Search Report for EP Patent Application 16200660.5, dated May 8, 2017, 6 pages.
Office Action for U.S. Appl. No. 15/454,805 dated May 11, 2017, 22 pages.
Office Action for U.S. Appl. No. 14/920,568 dated Jun. 16, 2017, 51 pages.
Office Action for U.S. Appl. No. 15/225,966 dated Jul. 7, 2017, 37 pages.
Office Action for U.S. Appl. No. 15/259,386 dated Jul. 6, 2017, 43 pages.
Office Action for U.S. Appl. No. 15/588,474 dated Jul. 11, 2017, 21 pages.
Office Action for U.S. Appl. No. 15/483,406 dated Aug. 4, 2017, 29 pages.
European Search Report for European Application Serial No. 17163289.6 dated Jul. 12, 2017, 11 pages.
Holma et al., "LTE for UMTS. Evolution to LTE-advanced, " Mar. 4, 2011, pp. 26-29, XP055386245.
Office Action for U.S. Appl. No. 15/450,940 dated Aug. 10, 2017, 28 pages.
Notice of Allowance for U.S. Appl. No. 14/920,568 dated Sep. 25, 2017, 27 pages.
Office Action for U.S. Appl. No. 15/613,726 dated Oct. 13, 2017, 28 pages.
European Office Action dated Oct. 9, 2017 for European Application Serial No. 17163289.6, 2 pages.
Notice of Allowance for U.S. Appl. No. 15/483,406 dated Nov. 7, 2017, 29 pages.
Notice of Allowance for U.S. Appl. No. 15/454,805 dated Aug. 16, 2017, 38 pages.
Non-Final Office Action received for U.S. Appl. No. 15/259,359, dated Apr. 17, 2018, 58 pages.
Notice of Allowance received for U.S. Appl. No. 15/259,359, dated Jun. 13, 2018, 25 Pages.
Final Office Action received for U.S. Appl. No. 15/711,649, dated Jun. 22, 2018, 30 Pages.
Decision to Grant a Patent received for Japanese Patent Application Serial No. 2016-153596, dated Mar. 27, 2018, 6 pages.
Communication pursuant to Rules 70(2) and 70a(2) EPC and reference to Rule 39(1) EPC for European Application Serial No. 16182672.2, dated Feb. 20, 2017, 2 pages.
Communication pursuant to Rules 70(2) and 70a(2) EPC and reference to Rule 39(1) EPC for European Application Serial No. 16187611.5 dated Mar. 13, 2017, 2 pages.
Communication pursuant to Rules 70(2) and 70a(2) EPC and reference to Rule 39(1) EPC for European Application Serial No. 16200660.5 dated Jun. 12, 2017, 2 pages.
Non-Final Office Action received for U.S. Appl. No. 15/715,239, dated Nov. 30, 2017, 20 pages.
Non-Final Office Action received for U.S. Appl. No. 15/416,568, dated Jun. 29, 2018, 43 pages.
Notice of Allowance for U.S. Appl. No. 15/711,649 dated Mar. 7, 2019, 30 pages.

(56) References Cited

OTHER PUBLICATIONS

Notice of Allowance for U.S. Appl. No. 15/368,462 dated Mar. 13, 2019, 36 pages.
Indian Office Action for Indian Application Serial No. 201614040060 dated Oct. 11, 2018, 5 pages.
Decision to Grant a Patent received for Japanese Patent Application Serial No. 2016-142261 dated Sep. 18, 2018, 6 pages (including English translation).
European Office Action for European Application Serial No. 17163289.6 dated Sep. 12, 2018, 7 pages.
Non-Final Office Action for U.S. Appl. No. 15/711,649, dated Oct. 16, 2018, 26 pages.
Notice of Allowance for U.S. Appl. No. 15/950,689, dated Feb. 13, 2019, 31 pages.
Office Action for U.S. Appl. No. 16/130,423 dated Mar. 5, 2019, 39 pages.
Office Action for U.S. Appl. No. 15/259,386 dated Mar. 21, 2019, 39 pages.
Notice of Allowance for U.S. Appl. No. 15/711,649 dated Mar. 7, 2013, 30 pages.
Notice of Allowance for U.S. Appl. No. 15/368,462 dated Mar. 13, 2013, 36 pages.
Office Action dated Aug. 3, 2018 for U.S. Appl. No. 15/259,386, 44 pages.
Office Action dated Aug. 1, 2018 for U.S. Appl. No. 15/368,462, 64 pages.
Office Action received for U.S. Appl. No. 15/950,689, dated Aug. 1, 2018, 35 pages.
Office Action received for U.S. Appl. No. 15/214,431, dated Aug. 10, 2018, 60 pages.
Office Action for U.S. Appl. No. 15/713,099 dated Sep. 6, 2018, 45 pages.

\* cited by examiner

METHOD AND APPARATUS FOR USE OF SIMULTANEOUS MULTIPLE CHANNELS IN THE DYNAMIC FREQUENCY SELECTION BAND IN WIRELESS NETWORKS

CROSS-REFERENCE TO RELATED APPLICATIONS

This application claims priority to U.S. patent application Ser. No. 14/920,568 titled METHOD AND APPARATUS FOR USE OF SIMULTANEOUS MULTIPLE CHANNELS IN THE DYNAMIC FREQUENCY SELECTION BAND IN WIRELESS NETWORKS and filed on Oct. 22, 2015 which claims priority to U.S. Provisional Patent Application No. 62/200,764 titled METHOD AND APPARATUS FOR USE OF SIMULTANEOUS MULTIPLE CHANNELS IN THE DYNAMIC FREQUENCY SELECTION BAND IN WIRELESS NETWORKS and filed on Aug. 4, 2015, the disclosures of which is hereby incorporated herein by reference in its entirety.

BACKGROUND

The present invention relates to wireless networks and more specifically to systems and methods for selecting available channels free of occupying signals from a plurality of radio frequency channels. Embodiments of the present invention provide methods and systems for exploiting licensed and unlicensed bands requiring radar detection and detection of other occupying signals, such as the Dynamic Frequency Selection (DFS) channels in the Unlicensed National Information Infrastructure (U-NII) bands, to enable additional bandwidth for 802.11 ac/n and LTE in unlicensed spectrum (LTE-U) networks employing a wireless agility agent.

Wi-Fi networks are crucial to today's portable modern life. Wi-Fi is the preferred network in the growing Internet-of-Things (IoT). But, the technology behind current Wi-Fi has changed little in the last ten years. The Wi-Fi network and the associated unlicensed spectrum are currently managed in inefficient ways. For example, there is little or no coordination between individual networks and equipment from different manufacturers. Such networks generally employ primitive control algorithms that assume the network consists of "self-managed islands," a concept originally intended for low density and low traffic environments. The situation is far worse for home networks, which are assembled in completely chaotic ad hoc ways. Further, with more and more connected devices becoming commonplace, the net result is growing congestion and slowed networks with unreliable connections.

Similarly, LTE-U networks operating in the same or similar unlicensed bands as 802.11ac/n Wi-Fi suffer similar congestion and unreliable connection issues and will often create congestion problems for existing Wi-Fi networks sharing the same channels. Additional bandwidth and better and more efficient utilization of spectrum is key to sustaining the usefulness of wireless networks including the Wi-Fi and LTE-U networks in a fast growing connected world.

Devices operating in certain parts of the 5 GHz U-NII-2 band, known as the DFS channels, require active radar detection. This function is assigned to a device capable of detecting radar known as a DFS master, which is typically an access point or router. The DFS master actively scans the DFS channels and performs a channel availability check (CAC) and periodic in-service monitoring (ISM) after the channel availability check. The channel availability check lasts 60 seconds as required by the FCC Part 15 Subpart E and ETSI 301 893 standards. The DFS master signals to the other devices in the network (typically client devices) by transmitting a DFS beacon indicating that the channel is clear of radar. Although the access point can detect radar, wireless clients typically cannot. Because of this, wireless clients must first passively scan DFS channels to detect whether a beacon is present on that particular channel. During a passive scan, the client device switches through channels and listens for a beacon transmitted at regular intervals by the access point on an available channel.

Once a beacon is detected, the client is allowed to actively scan on that channel. If the DFS master detects radar in that channel, the DFS master no longer transmits the beacon, and all client devices upon not sensing the beacon within a prescribed time must vacate the channel immediately and remain off that channel for 30 minutes. For clients associated with the DFS master network, additional information in the beacons (i.e. the channel switch announcement) can trigger a rapid and controlled evacuation of the channel. Normally, a DFS master device is an access point with only one radio and is able to provide DFS master services for just a single channel. A significant problem of this approach is, in the event of a radar event or a more-common false-detect, the single channel must be vacated and the ability to use DFS channels is lost. This disclosure recognizes and addresses, in at least certain embodiments, the problems with current devices for detecting occupying signals including current DFS devices.

SUMMARY

The present invention relates to wireless networks and more specifically to systems and methods for selecting available channels free of occupying signals from a plurality of radio frequency channels. The present invention employs a wireless agility agent to access additional bandwidth for wireless networks, such as IEEE 802.11ac/n and LTE-U networks. The additional bandwidth is derived from channels that require avoidance of channels with occupying signals. For example, additional bandwidth is derived from special compliance channels that require radar detection, such as the DFS channels of the U-NII-2 bands, by employing multi-channel radar detection and in-service monitoring, and active channel selection controls.

In an embodiment, the present invention utilizes an agility agent employing proprietary embedded radio techniques including continuous multi-carrier spectrum monitoring, an embedded computation element employing proprietary real-time spectrum analysis algorithms, and proprietary signaling and control protocols to provide detection and continuous real-time monitoring of multiple radar types and patterns, and other signals such as interferers and measures of congestion and traffic, across simultaneous multiple channels.

The present invention may also utilize a cloud-based computation and control element, which together with the wireless agility agent forms a split-intelligence architecture. In this architecture, the embedded sensor information from the agility agent—such as radar detection channel availability check and in-service monitoring together with measurements of interference, traffic, identification of neighboring devices, and other spectrum and location information—is communicated to and integrated over time within the cloud intelligence engine. Also the embedded sensor information from the agility agent may be fused with spectrum information from other agility agents distributed in space, filtered, and post-processed. The embedded sensor information from the agility agent may further be merged with other data from other sources to provide improvements to fundamental signal measurement and network reliability problems such as augmented radar sensitivity, reduced false-detect rates, and reliable discovery of hidden nodes.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION

The present invention relates to wireless networks and more specifically to systems and methods for selecting available channels free of occupying signals from a plurality of radio frequency channels. As used herein, a channel "free" of occupying signals may include a channel with occupying signals that are lower than a signal threshold including signal strength, quantity, or traffic. The present invention employs a wireless agility agent to access additional bandwidth for wireless networks, such as IEEE 802.11ac/n and LTE-U networks. The additional bandwidth is derived from channels that require avoidance of occupying signals. For example, additional bandwidth is derived from special compliance channels that require radar detection—such as the DFS channels of the U-NII-2 bands—by employing multi-channel radar detection and in-service monitoring, and active channel selection controls. The DFS master actively scans the DFS channels and performs a channel availability check and periodic in-service monitoring after the channel availability check.

Figure 1:
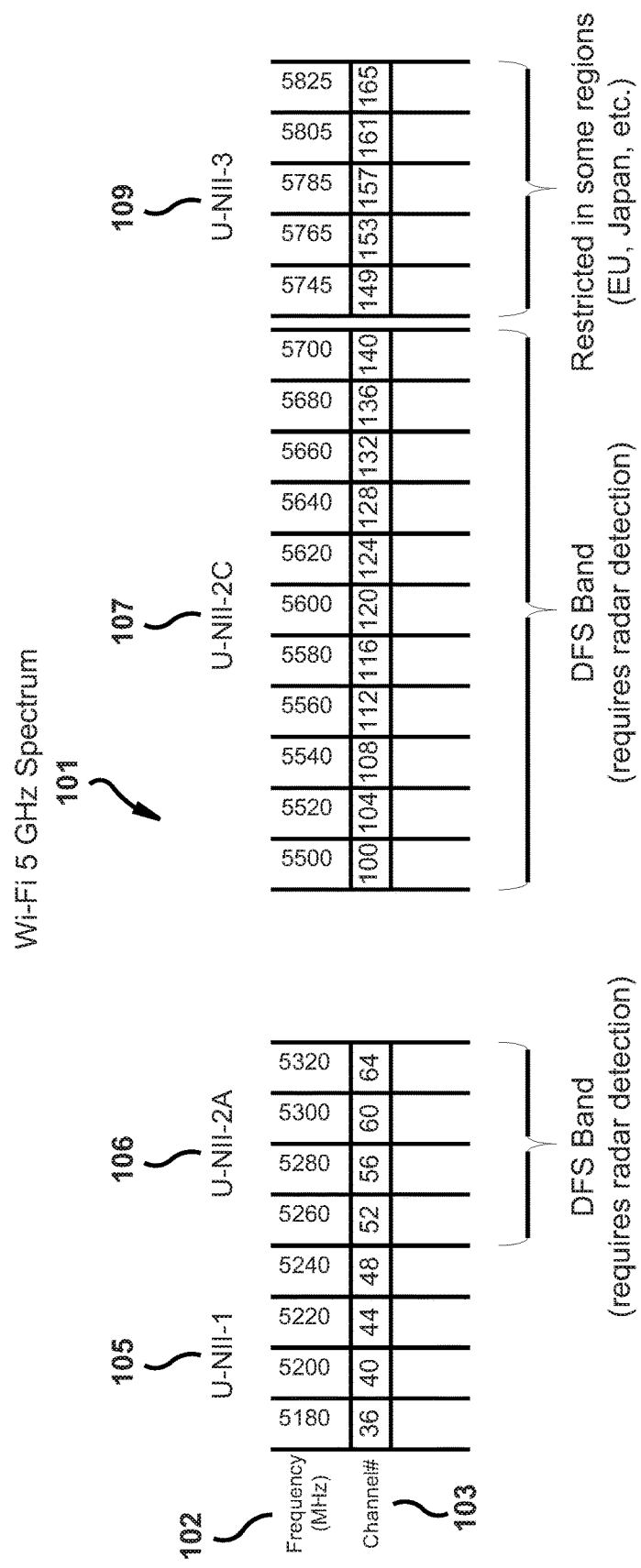
FIG. 1 illustrates portions of the 5 GHz Wi-Fi spectrum including portions that require active monitoring for radar signals.

FIG. 1 illustrates portions of the 5 GHz Wi-Fi spectrum 101. FIG. 1 shows the frequencies 102 and channels 103 that make up portions of the 5 GHz Wi-Fi spectrum 101. The U-NII band is an FCC regulatory domain for 5-GHz wireless devices and is part of the radio frequency spectrum used by IEEE 802.11ac/n devices and by many wireless ISPs. It operates over four ranges. The U-NII-1 band 105 covers the 5.15-5.25 GHz range. The U-NII-2A band 106 covers the 5.25-5.35 GHz range. The U-NII-2A band 106 is subject to DFS radar detection and avoidance requirements. The U-NII-2C band 107 covers the 5.47-5.725 GHz range. The U-NII-2C band 107 is also subject to DFS radar detection and avoidance requirements. The U-NII-3 band 109 covers the 5.725 to 5.850 GHz range. Use of the U-NII-3 band 109 is restricted in some jurisdictions like the European Union and Japan.

When used in an 802.11ac/n or LTE-U wireless network, the agility agent of the present invention functions as an autonomous DFS master device. In contrast to conventional DFS master devices, the agility agent is not an access point or router, but rather is a standalone wireless device employing inventive scanning techniques described herein that provide DFS scan capabilities across multiple channels, enabling one or more access point devices and peer-to-peer client devices to exploit simultaneous multiple DFS channels. The standalone autonomous DFS master of the present invention may be incorporated into another device such as an access point, LTE-U host, base station, cell, or small cell, media or content streamer, speaker, television, mobile phone, mobile router, software access point device, or peer to peer device but does not itself provide network access to client devices. In particular, in the event of a radar event or a false-detect, the enabled access point and clients or wireless device are able to move automatically, predictively and very quickly to another DFS channel.

Figure 2:
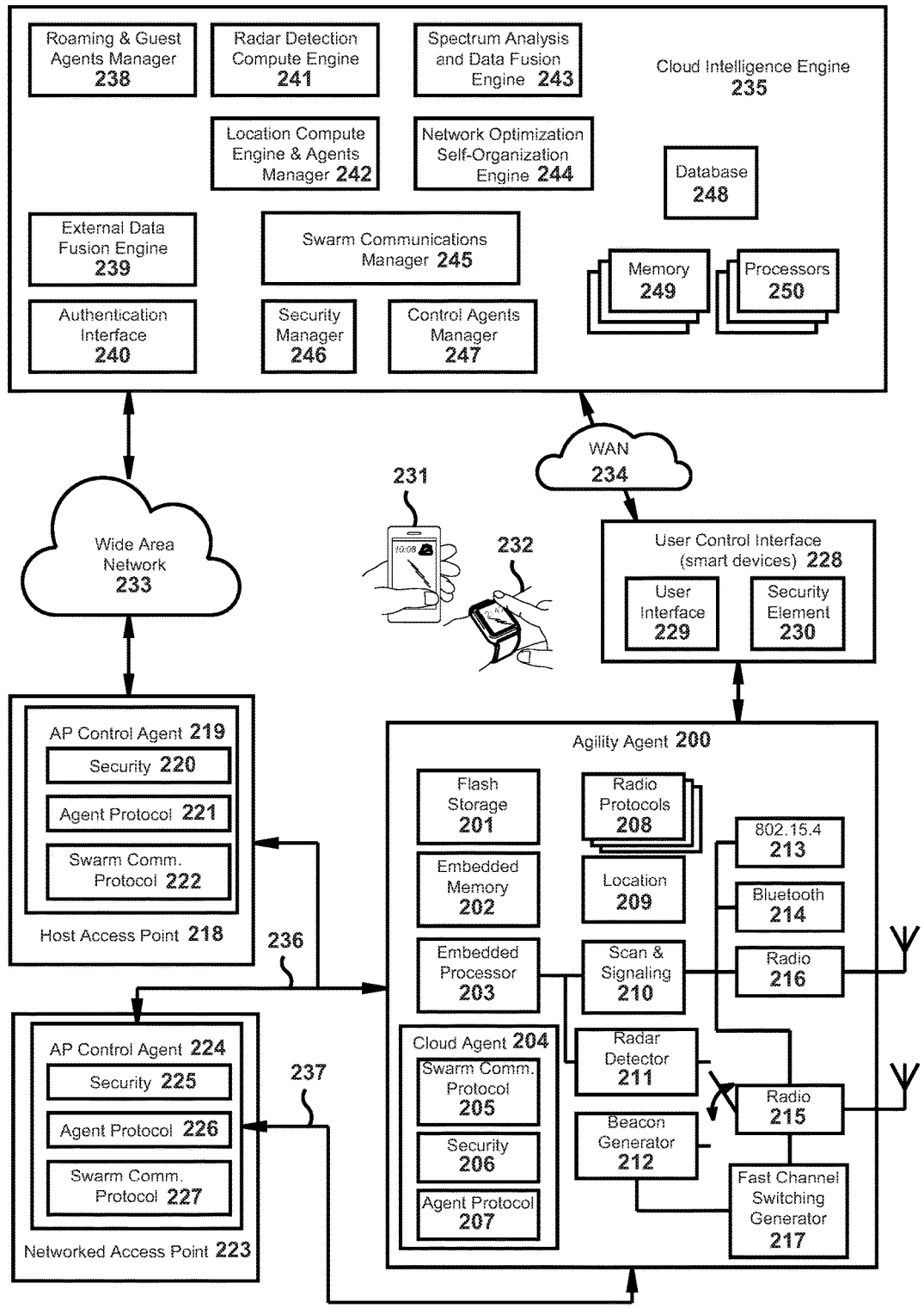
FIG. 2 illustrates how such an exemplary autonomous DFS master may interface with a conventional host access point, a cloud-based intelligence engine, and client devices in accordance with the present invention.

FIG. 2 provides a detailed illustration of an exemplary system of the present invention. As illustrated in FIG. 2, the agility agent 200, in the role of an autonomous DFS master device, may control at least one access point, the host access point 218, to dictate channel selection primarily by (a) signaling availability of one or more DFS channels by simultaneous transmission of one or more beacon signals; (b) transmitting a listing of both the authorized available DFS channels, herein referred to as a whitelist, and the prohibited DFS channels in which a potential radar signal has been detected, herein referred to as a blacklist, along with control signals and a time-stamp signal, herein referred to as a dead-man switch timer via an associated non-DFS channel; (c) transmitting the same signals as (b) over a wired medium such as Ethernet or serial cable; and (d) receiving control, coordination and authorized and preferred channel selection guidance information from the cloud intelligence engine 235. The agility agent 200 sends the time-stamp signal, or dead-man switch timer, with communications to ensure that the access points 218, 223 do not use the information, including the whitelist, beyond the useful lifetime of the information. For example, a whitelist will only be valid for certain period of time. The time-stamp signal avoids using noncompliant DFS channels by ensuring that an access point will not use the whitelist beyond its useful lifetime. The present invention allows currently available 5 GHz access points without radar detection—which cannot operate in the DFS channels—to operate in the DFS channels by providing the radar detection required by the FCC or other regulatory agencies.

The host access point 218 and any other access point devices 223 under control of the autonomous DFS master 200 typically have the control agent portion 219, 224 installed within their communication stack. The control agent 219, 224 is an agent that acts under the direction of the agility agent 200 to receive information and commands from the agility agent 200. The control agent 219, 224 acts on information from the agility agent 200. For example, the control agent 219, 224 listens for information like a whitelist or blacklist from the agility agent. If a radar signal is detected by the agility agent 200, the agility agent 200 communicates that to the control agent 219, 224, and the control agent 219, 224 acts to evacuate the channel immediately. The control agent can also take commands from the agility agent 200. For example, the host access point 218 and network access point 223 can offload DFS monitoring to the agility agent 200 as long as they can listen to the agility agent 200 and take commands from the agility agent regarding available DFS channels.

The host access point 218 is connected to a wide area network 233 and includes an access point control agent 219 to facilitate communications with the agility agent 200. The access point control agent 219 includes a security module 220 and agent protocols 221 to facilitate communication with the agility agent 200, and swarm communication protocols 222 to facilitate communications between agility agents, access points, client devices, and other devices in the network. The agility agent 200 connects to the cloud intelligence engine 235 via the host access point 218 and the wide area network 233. The access point sets up a secure tunnel to communicate with the cloud intelligence engine 235 through, for example, an encrypted control API in the host access point 218. The agility agent 200 transmits information to the cloud intelligence engine 235 such as whitelists, blacklists, state information, location information, time signals, scan lists (for example, showing neighboring access points), congestion (for example, number and type of re-try packets), and traffic information. The cloud intelligence engine 235 communicates information to the agility agent 200 via the secure communications tunnel such as access point location (including neighboring access points), access point/cluster current state and history, statistics (including traffic, congestion, and throughput), whitelists, blacklists, authentication information, associated client information, and regional and regulatory information. The agility agent 200 uses the information from the cloud intelligence engine 235 to control the access points and other network devices.

The agility agent 200 may communicate via wired connections or wirelessly with the other network components. In the illustrated example, the agility agent 200 includes a primary radio 215 and a secondary radio 216. The primary radio 215 is for DFS and radar detection and is typically a 5 GHz radio. The agility agent 200 may receive radar signals, traffic information, and/or congestion information through the primary radio 215. And the agility agent 200 may transmit information such as DFS beacons via the primary radio 215. The second radio 216 is a secondary radio for sending control signals to other devices in the network and is typically a 2.4 GHz radio. The agility agent 200 may receive information such as network traffic, congestion, and/or control signals with the secondary radio 216. And the agility agent 200 may transmit information such as control signals with the secondary radio 216. The primary radio 215 is connected to a fast channel switching generator 217 that includes a switch and allows the primary radio 215 to switch rapidly between a radar detector 211 and beacon generator 212. The channel switching generator 217 allows the radar detector 211 to switch sufficiently fast to appear to be on multiple channels at a time.

In one embodiment, a standalone multi-channel DFS master includes a beacon generator 212 to generate a beacon in each of a plurality of 5 GHz radio channels, a radar detector 211 to scan for a radar signal in each of the plurality of 5 GHz radio channels, a 5 GHz radio transceiver 215 to transmit the beacon in each of the plurality of 5 GHz radio channels and to receive the radar signal in each of the plurality of 5 GHz radio channels, and a fast channel switching generator 217 coupled to the radar detector, the beacon generator, and the 5 GHz radio transceiver. The fast channel switching generator 217 switches the 5 GHz radio to a first channel of the plurality of 5 GHz radio channels and then causes the beacon generator 212 to generate the beacon in the first channel of the plurality of 5 GHz radio channels. Then the fast channel switching generator 217 causes the radar detector 211 to scan for the radar signal in the first channel of the plurality of 5 GHz radio channels. The fast channel switching generator 217 then repeats these steps for each other channel of the plurality of 5 GHz radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the agility agent 200 cycles between beaconing and scanning in each of the plurality of 5 GHz radio channels in the time window between a first beaconing and scanning in a given channel and a subsequent beaconing and scanning the same channel, it can provide effectively simultaneous beaconing and scanning for multiple channels.

The agility agent 200 also may contain a Bluetooth radio 214 and an 802.15.4 radio 213 for communicating with other devices in the network. The agility agent 200 may include various radio protocols 208 to facilitate communication via the included radio devices.

The agility agent 200 may also include a location module 209 to geolocate or otherwise determine the location of the agility agent 200. As shown in FIG. 2, the agility agent 200 may include a scan and signaling module 210. The agility agent 200 includes embedded memory 202, including for example flash storage 201, and an embedded processor 203. The cloud agent 204 in the agility agent 200 facilitates aggregation of information from the cloud agent 204 through the cloud and includes swarm communication protocols 205 to facilitate communications between agility agents, access points, client devices, and other devices in the network. The cloud agent 204 also includes a security module 206 to protect and secure the agility agent's 200 cloud communications as well as agent protocols 207 to facilitate communication with the access point control agents 219, 224.

As shown in FIG. 2, the agility agent 200 may control other access points, for example networked access point 223, in addition to the host access point 218. The agility agent 200 may communicate with the other access points 223 via a wired or wireless connection 236, 237. The other access points 223 include an access point control agent 224 to facilitate communication with the agility agent 200 and other access points. The access point control agent 224 includes a security module 225, agent protocols 226 and swarm communication protocols 227 to facilitate communications with other agents (including other access points and client devices) on the network.

The cloud intelligence engine 235 includes a database 248 and memory 249 for storing information from the agility agent 200, other agility agents (not shown) connected to the intelligence engine 235, and external data sources (not shown). The database 248 and memory 249 allow the cloud intelligence engine 235 to store information over months and years received from agility agents and external data sources.

The cloud intelligence engine 235 also includes processors 250 to perform the cloud intelligence operations described herein. The roaming and guest agents manager 238 in the cloud intelligence engine 235 provides optimized connection information for devices connected to agility agents that are roaming from one access point to other or from one access point to another network. The roaming and guest agents manager 238 also manages guest connections to networks for agility agents connected to the cloud intelligence engine 235. The external data fusion engine 239 provides for integration and fusion of information from agility agents with information from external data sources for example GIS information, other geographical information, FCC information regarding the location of radar transmitters, FCC blacklist information, NOAA databases, DOD information regarding radar transmitters, and DOD requests to avoid transmission in DFS channels for a given location. The cloud intelligence engine 235 further includes an authentication interface 240 for authentication of received communications and for authenticating devices and users. The radar detection compute engine 241 aggregates radar information from agility agents and external data sources and computes the location of radar transmitters from those data to, among other things, facilitate identification of false positive radar detections or hidden nodes and hidden radar. The radar detection compute engine 241 may also guide or steer multiple agility agents to dynamically adapt detection parameters and/or methods to further improve detection sensitivity. The location compute and agents manager 242 determines the location the agility agent 200 and other connected devices through Wi-Fi lookup in a Wi-Fi location database, querying passing devices, scan lists from agility agents, or geometric inference.

The spectrum analysis and data fusion engine 243 and the network optimization self organization engine 244 facilitate dynamic spectrum optimization with information from the agility agents and external data sources. Each of the agility agents connected to the cloud intelligence engine 235 have scanned and analyzed the local spectrum and communicated that information to the cloud intelligence engine 235. The cloud intelligence engine 235 also knows the location of each agility agent and the access points proximate to the agility agents that do not have a controlling agent as well as the channel on which each of those devices is operating. With this information, the spectrum analysis and data fusion engine 243 and the network optimization self-organization engine 244 can optimize the local spectrum by telling agility agents to avoid channels subject to interference. The swarm communications manager 245 manages communications between agility agents, access points, client devices, and other devices in the network. The cloud intelligence engine includes a security manager 246. The control agents manager 247 manages all connected control agents.

Independent of a host access point 218, the agility agent 200, in the role of an autonomous DFS master device, may also provide the channel indication and channel selection control to one or more peer-to-peer client devices 231, 232 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 235. The agility agent 200 sends the time-stamp signal, or dead-man switch timer, with communications to ensure that the devices do not use the information, including the whitelist, beyond the useful lifetime of the information. For example, a whitelist will only be valid for certain period of time. The time-stamp signal avoids using noncompliant DFS channels by ensuring that a device will not use the whitelist beyond its useful lifetime.

Such peer-to-peer devices may have a user control interface 228. The user control interface 228 includes a user interface 229 to allow the client devices 231, 232 to interact with the agility agent 200 via the cloud intelligence engine 235. For example, the user interface 229 allows the user to modify network settings via the agility agent 200 including granting and revoking network access. The user control interface 228 also includes a security element 230 to ensure that communications between the client devices 231, 232 and the agility agent 200 are secure. The client devices 231, 232 are connected to a wide area network 234 via a cellular network for example. Peer-to-peer wireless networks are used for direct communication between devices without an access point. For example, video cameras may connect directly to a computer to download video or images files using a peer-to-peer network. Also, device connections to external monitors and device connections to drones currently use peer-to-peer networks. Because there is no access point in a peer-to-peer network, traditional peer-to-peer networks cannot use the DFS channels because there is no access point to control the DFS channel selection and tell the devices what DFS channels to use. The present invention overcomes this limitation.

Figure 3:
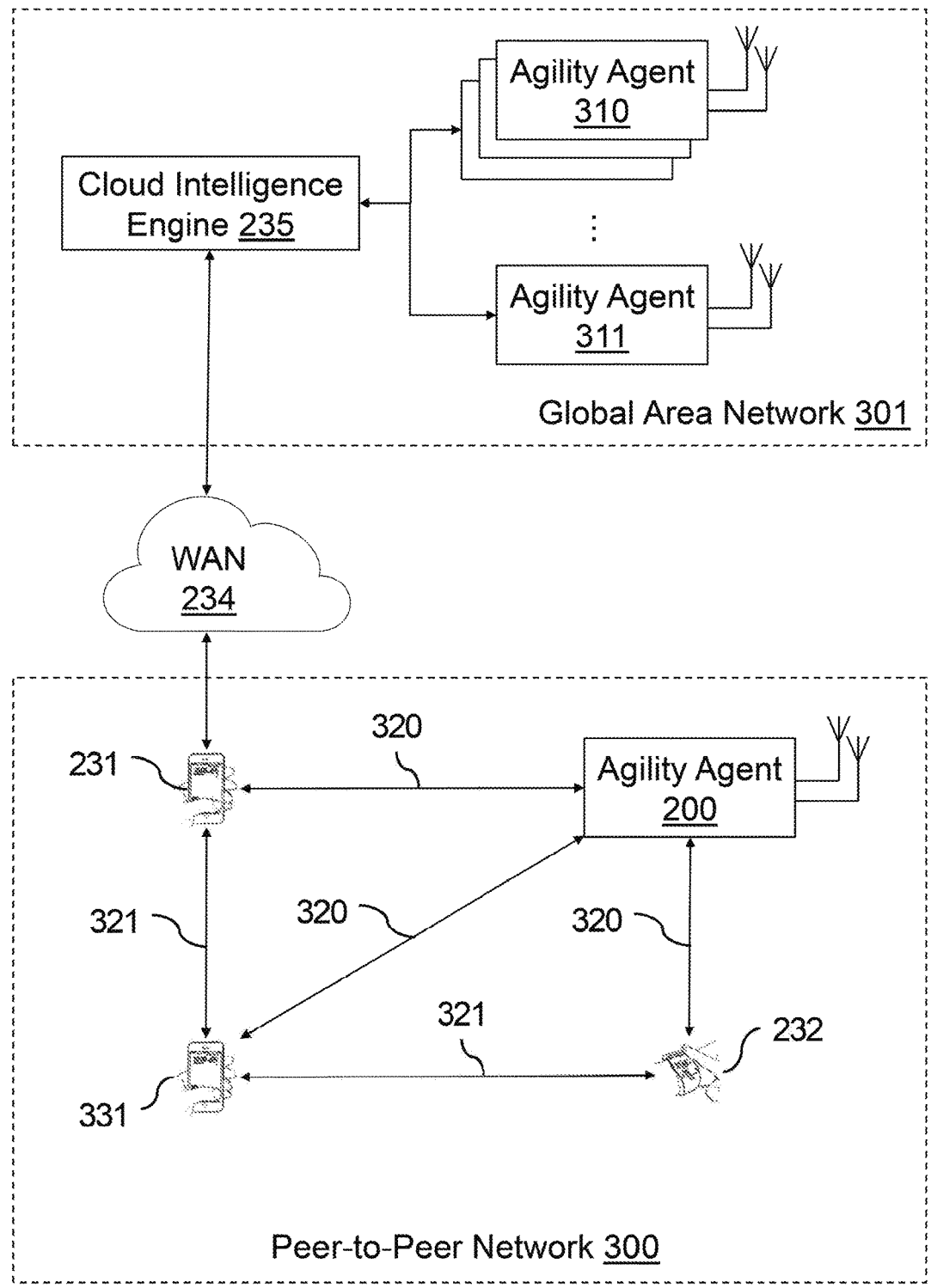
FIG. 3 illustrates how an exemplary autonomous DFS master in a peer-to-peer network may interface with client devices and the cloud intelligence engine independent of any access point, in accordance with the present invention.

FIG. 3 illustrates how the agility agent 200 acting as an autonomous DFS master in a peer-to-peer network 300 (a local area network for example) would interface to client devices 231, 232, 331 and the cloud intelligence engine 235 independent of any access point, in accordance with the present invention. As shown in FIG. 3, the cloud intelligence engine 235 may be connected to a plurality of network-connected agility agents 200, 310. The agility agent 200 in the peer-to-peer network 300 may connect to the cloud intelligence engine 235 through one of the network-connected client devices 231, 331 by, for example, piggybacking a message to the cloud intelligence engine 235 on a message send to the client devices 231, 331 or otherwise coopting the client devices' 231, 331 connection to the wide area network 234. In the peer-to-peer network 300, the agility agent 200 sends over-the-air control signals 320 to the client devices 231, 232, 331 including indications of channels free of occupying signals such as DFS channels free of radar signals. Alternatively, the agility agent communicates with just one client device 331 which then acts as the group owner to initiate and control the peer-to-peer communications with other client devices 231, 232. The client devices 231, 232, 331 have peer-to-peer links 321 through which they communicate with each other.

The agility agent may operate in multiple modes executing a number of DFS scan methods employing different algorithms. Two of these methods are illustrated in FIG. 4 and FIG. 5.

Figure 4:
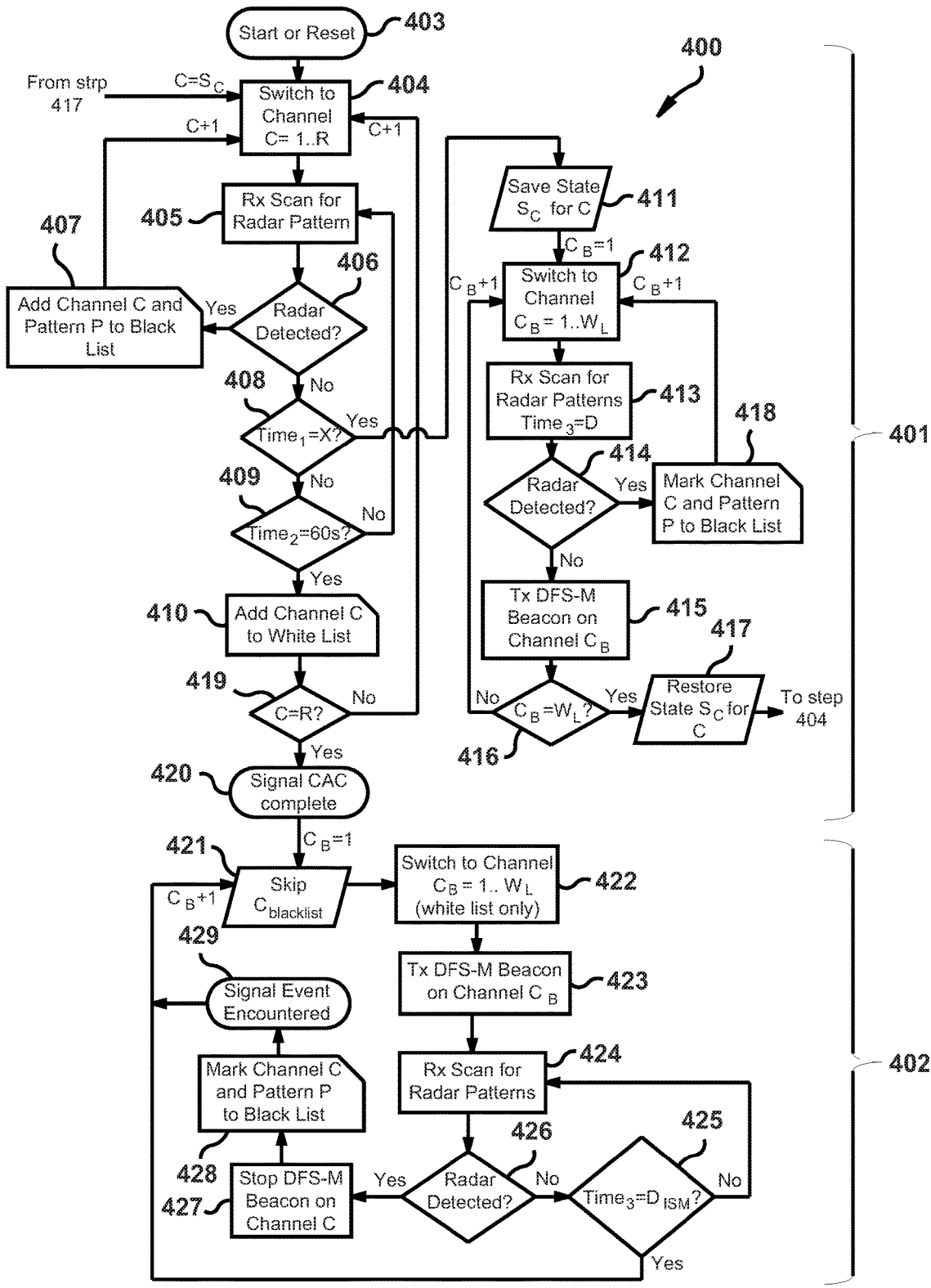
FIG. 4 illustrates a method of performing a channel availability check phase and in-service monitoring phase in a DFS scanning operation with an autonomous DFS master to make multiple DFS channels of the 5 GHz band simultaneously available for use according to the present invention using a time-division multiplexed sequential channel availability check followed by continuous in-service monitoring.
Figure 5:
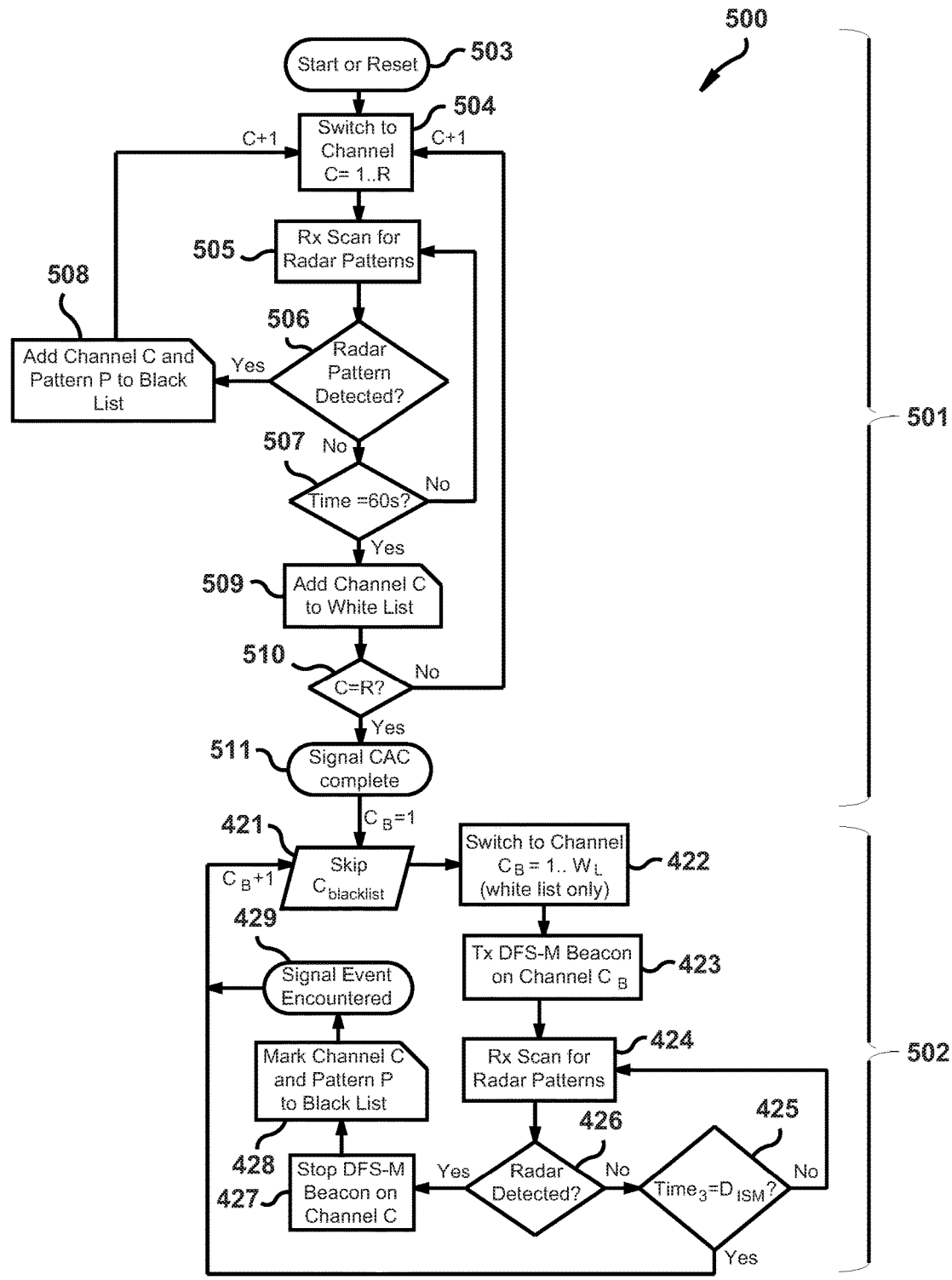
FIG. 5 illustrates a method of performing a channel availability check phase and in-service monitoring phase in a DFS scanning operation with an autonomous DFS master to make multiple DFS channels of the 5 GHz band simultaneously available for use according to the present invention using a continuous sequential channel availability check followed by continuous in-service monitoring.

FIG. 4 illustrates a first DFS scan method 400 for a multi-channel DFS master of the present invention. This method uses a time division sequential CAC 401 followed by continuous ISM 402. The method begins at step 403 with the multi-channel DFS master at startup or after a reset. At step 404 the embedded radio is set to receive (Rx) and is tuned to the first DFS channel (C=1). In one example, the first channel is channel 52. Next, because this is the first scan after startup or reset and the DFS master does not have information about channels free of radar, the DFS master performs a continuous CAC 405 scan for a period of 60 seconds (compliant with the FCC Part 15 Subpart E and ETSI 301 893 requirements). At step 406 the DFS master determines if a radar pattern is present in the current channel. If radar pattern is detected 407, then the DFS master marks this channel in the blacklist. The DFS master may also send additional information about the detected radar including the signal strength, radar pattern, type of radar, and a time stamp for the detection.

At the first scan after startup or reset, if a radar pattern is detected in the first channel scanned, the DFS master may repeat the above steps until a channel free of radar signals is found. Alternatively, after a startup or reset, the DFS master may be provided a whitelist indicating one or more channels that have been determined to be free of radar signals. For example, the DFS master may receive a message that channel 52 is free of radar signals from the cloud intelligence engine 235 along with information fused from other sources.

If at step 406 the DFS master does not detect a radar pattern 410, the DFS master marks this channel in the whitelist and switches the embedded radio to transmit (Tx) (not shown in FIG. 4) at this channel. The DFS master may include additional information in the whitelist including a time stamp. The DFS master then transmits (not shown in FIG. 4) a DFS master beacon signal for minimum required period of n (which is the period of the beacon transmission defined by IEEE 802.11 requirements, usually very short on the order of a few microseconds). A common SSID may be used for all beacons of our system.

For the next channel scan after the DFS master finds a channel free of radar, the DFS master sets the radio to receive and tunes the radio to the next DFS channel 404 (for example channel 60). The DFS master then performs a non-continuous CAC radar detection scan 405 for period of X, which is the maximum period between beacons allowable for a client device to remain associated with a network ($P_M$) less a period of n required for a quick radar scan and the transmission of the beacon itself ($X=P_M-n$) 408. At 411, the DFS master saves the state of current non-continuous channel state ($S_C$) from the non-continuous CAC scan so that the DFS master can later resume the current non-continuous channel scan at the point where the DFS master left off. Then, at step 412, the DFS master switches the radio to transmit and tunes to the first DFS channel (in this example it was CH 52), performs quick receive radar scan 413 (for a period of D called the dwell time) to detect radar 414. If a radar pattern is detected, the DFS master marks the channel to the blacklist 418. When marking the channel to the blacklist, the DFS master may also include additional information about the detected radar pattern including signal strength, type of radar, and a time stamp for the detection. If no radar pattern is detected, the DFS master transmits again 415 the DFS master beacon for the first channel (channel 52 in the example). Next, the DFS master determines if the current channel ($C_B$) is the last channel in the whitelist ($W_L$) 416. In the current example, the current channel, channel 52, is the only channel in the whitelist at this point. Then, the DFS master restores 417 the channel to the saved state from step 411 and switches the radio back to receive mode and tunes the radio back to the current non-continuous CAC DFS channel (channel 60 in the example) 404. The DFS master then resumes the non-continuous CAC radar scan 405 for period of X, again accommodating the period of n required for the quick scan and transmission of the beacon. This is repeated until 60 seconds of non-continuous CAC scanning is accumulated 409—in which case the channel is marked in the whitelist 410—or until a radar pattern is detected—in which case this channel is marked in the blacklist 407.

Next, the DFS master repeats the procedure in the preceding paragraph for the next DFS channel (for example channel 100). The DFS master periodically switches 412 to previous whitelisted DFS channels to do a quick scan 413 (for a period of D called the dwell time), and if no radar pattern detected, transmits a beacon 415 for period of n in each of the previously CAC scanned and whitelisted DFS channels. Then the DFS master returns 404 to resume the non-continuous CAC scan 405 of the current CAC channel (in this case CH 100). The period X available for non-continuous CAC scanning before switching to transmit and sequentially beaconing the previously whitelisted CAC scanned channels is reduced by n for each of the previously whitelisted CAC scanned channels, roughly $X=P_M-n*(W_L)$ where $W_L$ is the number of previously whitelisted CAC scanned channels. This is repeated until 60 seconds of non-continuous CAC scanning is accumulated for the current channel 409. If no radar pattern is detected the channel is marked in the whitelist 410. If a radar pattern is detected, the channel is marked in the blacklist 407 and the radio can immediately switch to the next DFS channel to be CAC scanned.

The steps in the preceding paragraph are repeated for each new DFS channel until all desired channels in the DFS band have been CAC scanned. In FIG. 4, step 419 checks to see if the current channel C is the last channel to be CAC scanned R. If the last channel to be CAC scanned R has been reached, the DFS master signals 420 that the CAC phase 401 is complete and begins the ISM phase 402. The whitelist and blacklist information may be communicated to the cloud intelligence engine where it is integrated over time and fused with similar information from other agility agents.

During the ISM phase, the DFS master does not scan the channels in the blacklist 421. The DFS master switches 422 to the first channel in the whitelist and transmits 423 a DFS beacon on that channel. Then the DFS master scans 424 the first channel in the whitelist for a period of DISM (the ISM dwell time) 425, which may be roughly $P_M$ (the maximum period between beacons allowable for a client device to remain associated with a network) minus n times the number of whitelisted channels, divided by the number of whitelisted channels ($D_{ISM}=(P_M-n*W_L)/n$). Then the DFS master transmits 423 a beacon and scans 424 each of the channels in the whitelist for the dwell time and then repeats starting at the first channel in the whitelist 422 in a round robin fashion for each respective channel. If a radar pattern is detected 426, the DFS master beacon for the respective channel is stopped 427, and the channel is marked in the blacklist 428 and removed from the whitelist (and no longer ISM scanned). The DFS master sends alert messages 429, along with the new whitelist and blacklist to the cloud intelligence engine. Alert messages may also be sent to other access points and/or client devices in the network.

FIG. 5 illustrates a second DFS scan method 500 for a multi-channel DFS master of the present invention. This method uses a continuous sequential CAC 501 followed by continuous ISM 502. The method begins at step 503 with the multi-channel DFS master at startup or after a reset. At step 504 the embedded radio is set to receive (Rx) and is tuned to the first DFS channel (C=1). In this example, the first channel is channel 52. The DFS master performs a continuous CAC scan 505 for a period of 60 seconds 507 (compliant with the FCC Part 15 Subpart E and ETSI 301 893 requirements). If radar pattern is detected at step 506 then the DFS master marks this channel in the blacklist 508.

If the DFS master does not detect radar patterns, it marks this channel in the whitelist 509. The DFS master determines if the current channel C is the last channel to be CAC scanned R at step 510. If not, then the DFS master tunes the receiver to the next DFS channel (for example channel 60) 504. Then the DFS master performs a continuous scan 505 for full period of 60 seconds 507. If a radar pattern is detected, the DFS master marks the channel in the blacklist 508 and the radio can immediately switch to the next DFS channel 504 and repeat the steps after step 504.

If no radar pattern is detected 509, the DFS master marks the channel in the whitelist 509 and then tunes the receiver next DFS channel 504 and repeats the subsequent steps until all DFS channels for which a CAC scan is desired. Unlike the method depicted in FIG. 4, no beacon is transmitted between CAC scans of sequential DFS channels during the CAC scan phase.

The ISM phase 502 in FIG. 5 is identical to that in FIG. 4 described above.

Figure 6A:
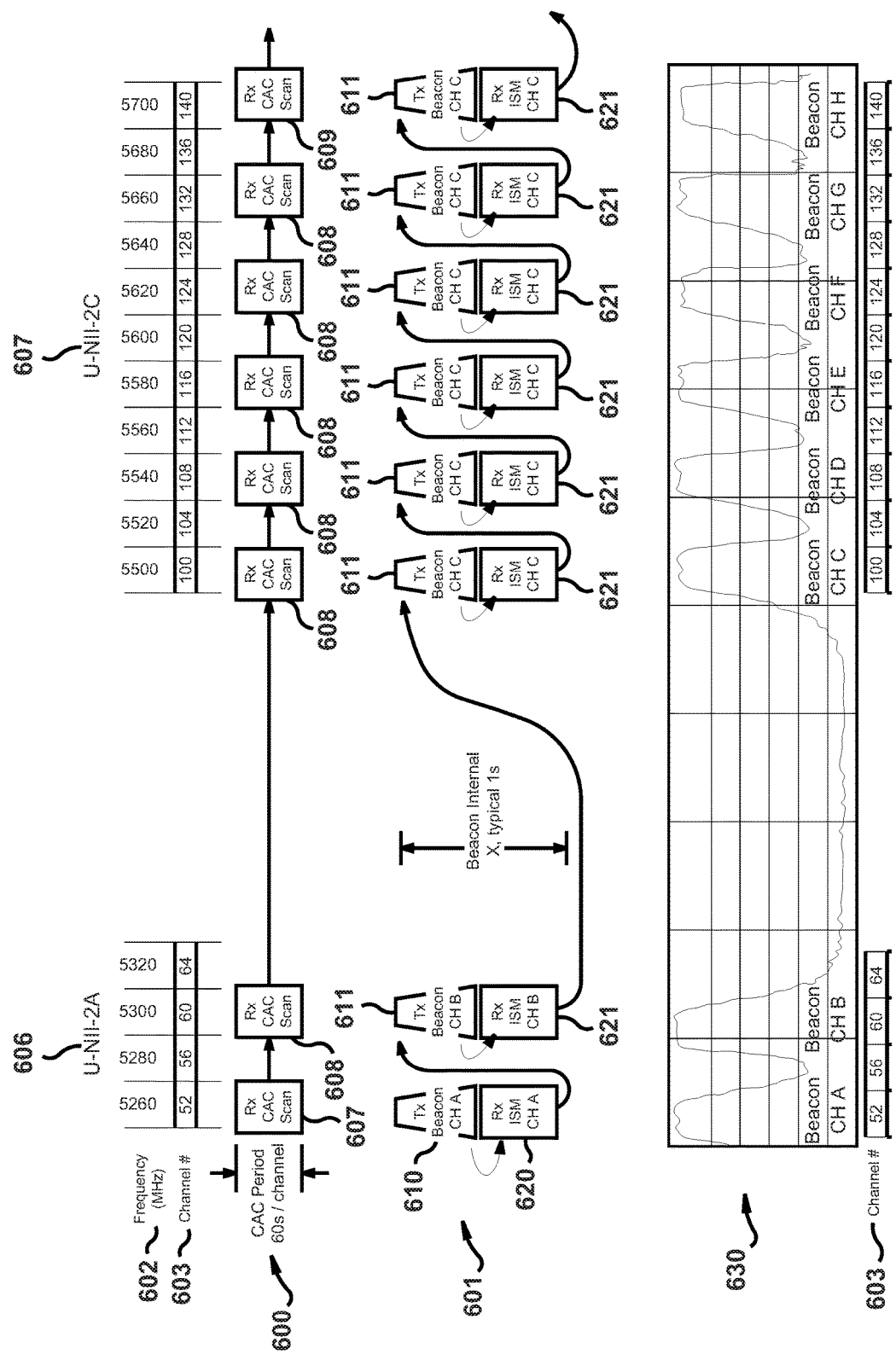
FIG. 6A illustrates a method of performing a channel availability check phase and in-service monitoring phase in a DFS scanning operation with an autonomous DFS master to make multiple DFS channels of the 5 GHz band simultaneously available for use according to the present invention.

FIG. 6A illustrates how multiple channels in the DFS channels of the 5 GHz band are made simultaneously available by use of the invention. FIG. 6A illustrates the process of FIG. 5 wherein the autonomous DFS Master performs the DFS scanning CAC phase 600 across multiple channels and upon completion of CAC phase, the autonomous DFS Master performs the ISM phase 601. During the ISM phase the DFS master transmits multiple beacons to indicate the availability of multiple DFS channels to nearby host and non-host (ordinary) access points and client devices, in accordance with the present invention.

FIG. 6A shows the frequencies 602 and channels 603 that make up portions of the DFS 5 GHz Wi-Fi spectrum. U-NII-2A 606 covers the 5.25-5.35 GHz range. U-NII-2C 607 covers the 5.47-5.725 GHz range. The first channel to undergo CAC scanning is shown at element 607. The subsequent CAC scans of other channels are shown at elements 608. And the final CAC scan before the ISM phase 601 is shown at element 609.

In the ISM phase 601, the DFS master switches to the first channel in the whitelist. In the example in FIG. 6A, each channel 603 for which a CAC scan was performed was free of radar signals during the CAC scan and was added to the whitelist. Then the DFS master transmits 610 a DFS beacon on that channel. Then the DFS master scans 620 the first channel in the whitelist for the dwell time. Then the DFS master transmits 611 a beacon and scans 621 each of the other channels in the whitelist for the dwell time and then repeats starting 610 at the first channel in the whitelist in a round robin fashion for each respective channel. If a radar pattern is detected, the DFS master beacon for the respective channel is stopped, and the channel is marked in the blacklist and removed from the whitelist (and no longer ISM scanned).

FIG. 6A also shows an exemplary waveform 630 of the multiple beacon transmissions from the DFS master to indicate the availability of the multiple DFS channels to nearby host and non-host (ordinary) access points and client devices.

Figure 6B:
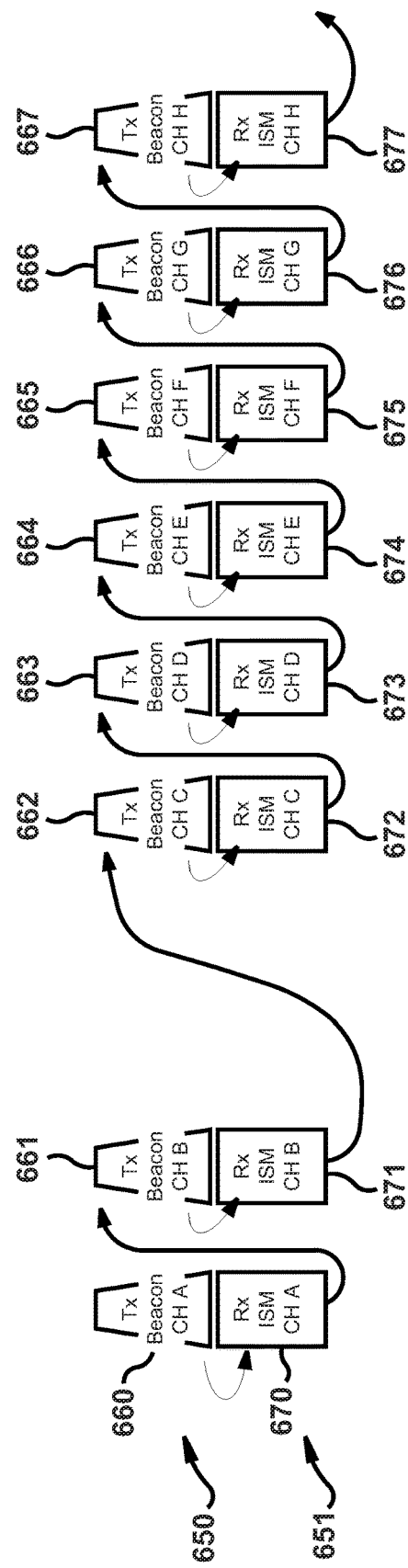
FIG. 6B illustrates an exemplary beacon transmission duty cycle and an exemplary radar detection duty cycle.

FIG. 6B illustrates a beacon transmission duty cycle 650 and a radar detection duty cycle 651. In this example, channel A is the first channel in a channel whitelist. In FIG. 6B, a beacon transmission in channel A 660 is followed by a quick scan of channel A 670. Next a beacon transmission in the second channel, channel B, 661 is followed by a quick scan of channel B 671. This sequence is repeated for channels C 662, 672; D 663, 673; E 664, 674; F 665, 675; G 666, 676, and H 667, 677. After the quick scan of channel H 677, the DFS master switches back to channel A and performs a second beacon transmission in channel A 660 followed by a second quick scan of channel A 670. The time between starting the first beacon transmission in channel A and starting the second beacon transmission in channel A is a beacon transmission duty cycle. The time between starting the first quick scan in channel A and starting the second quick scan in channel A is a radar detection duty cycle. In order to maintain connection with devices on a network, the beacon transmission duty cycle should be less than or equal to the maximum period between the beacons allowable for a client device to remain associated with the network.

One embodiment of the present invention provides a standalone multi-channel DFS master that includes a beacon generator 212 to generate a beacon in each of a plurality of 5 GHz radio channels, a radar detector 211 to scan for a radar signal in each of the plurality of 5 GHz radio channels, a 5 GHz radio transceiver 215 to transmit the beacon in each of the plurality of 5 GHz radio channels and to receive the radar signal in each of the plurality of 5 GHz radio channels, and a fast channel switching generator 217 and embedded processor 203 coupled to the radar detector, the beacon generator, and the 5 GHz radio transceiver. The fast channel switching generator 217 and embedded processor 203 switch the 5 GHz radio transceiver 215 to a first channel of the plurality of 5 GHz radio channels and cause the beacon generator 212 to generate the beacon in the first channel of the plurality of 5 GHz radio channels. The fast channel switching generator 217 and embedded processor 203 also cause the radar detector 211 to scan for the radar signal in the first channel of the plurality of 5 GHz radio channels. The fast channel switching generator 217 and embedded processor 203 then repeat these steps for each of the other channels of the plurality of 5 GHz radio channels. The fast channel switching generator 217 and embedded processor 203 perform all of the steps for all of the plurality of 5 GHz radio channels during a beacon transmission duty cycle which is a time between successive beacon transmissions on a specific channel and, in some embodiments, a radar detection duty cycle which is a time between successive scans on the specific channel.

Figure 7:
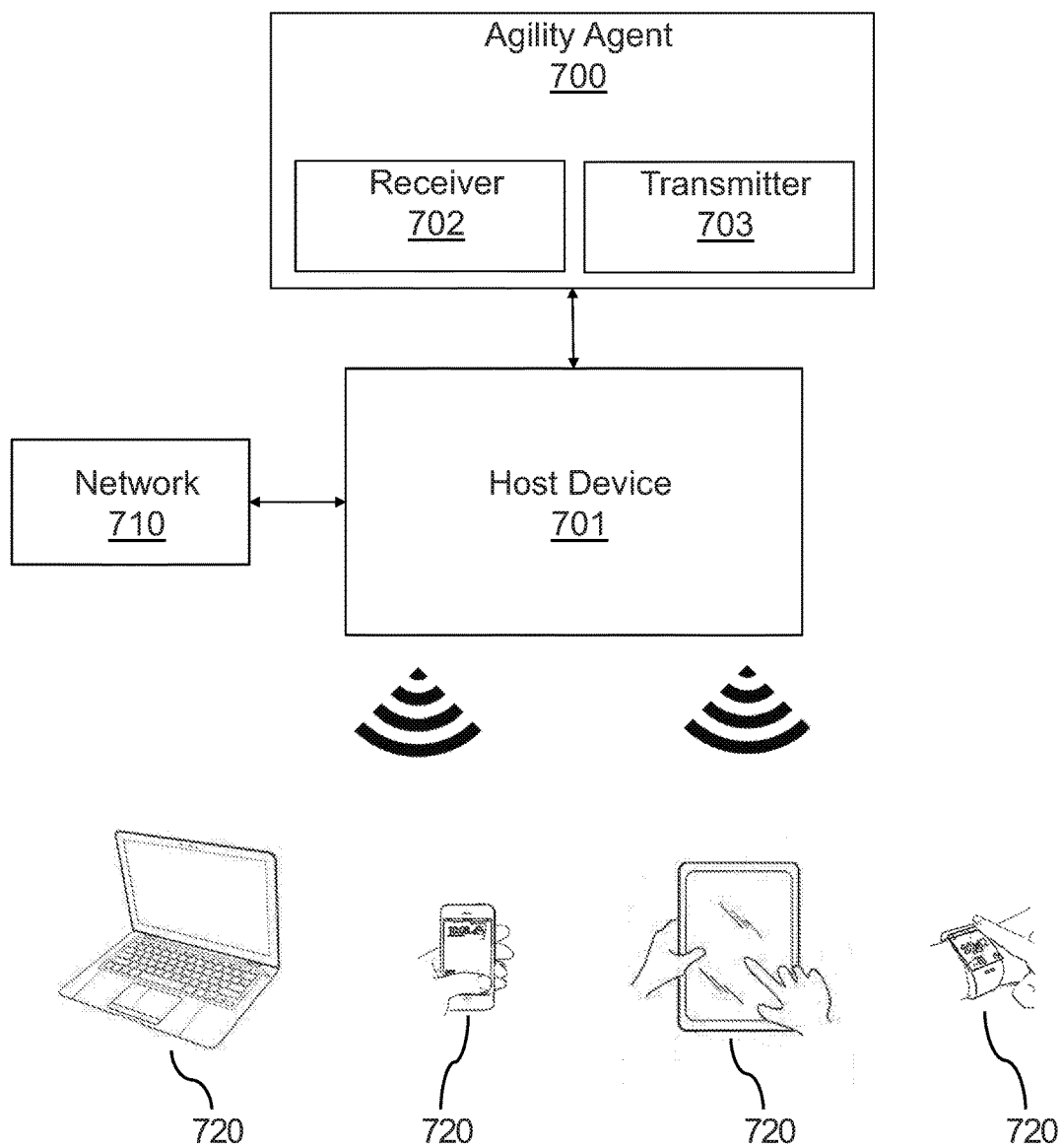
FIG. 7 illustrates an embodiment of the present invention in which the agility agent is connected to a host device and connected to a network via the host device.

In the embodiment illustrated in FIG. 7, the present invention includes systems and methods for selecting available channels free of occupying signals from a plurality of radio frequency channels. The system includes an agility agent 700 functioning as an autonomous frequency selection master that has both an embedded radio receiver 702 to detect the occupying signals in each of the plurality of radio frequency channels and an embedded radio transmitter 703 to transmit an indication of the available channels and an indication of unavailable channels not free of the occupying signals. The agility agent 700 is programmed to connect to a host device 701 and control a selection of an operating channel selection of the host device by transmitting the indication of the available channels and the indication of the unavailable channels to the host device. The host device 701 communicates wirelessly with client devices 720 and acts as a gateway for client devices to a network 710 such as the Internet, other wide area network, or local area network. The host device 701, under the control of the agility agent 700, tells the client devices 720 which channel or channels to use for wireless communication. Additionally, the agility agent 700 may be programmed to transmit the indication of the available channels and the indication of the unavailable channels directly to client devices 720.

The agility agent 700 may operate in the 5 GHz band and the plurality of radio frequency channels may be in the 5 GHz band and the occupying signals are radar signals. The host device 701 may be a Wi-Fi access point or an LTE-U host device.

Further, the agility agent 700 may also be programmed to transmit the indication of the available channels by simultaneously transmitting multiple beacon signals. And the agility agent 700 may be programmed to transmit the indication of the available channels by transmitting a channel whitelist of the available channels and to transmit the indication of the unavailable channels by transmitting a channel blacklist of the unavailable channels. In addition to saving the channel in the channel blacklist, the agility agent 700 may also be programmed to determine and save in the channel blacklist information about the detected occupying signals including signal strength, traffic, and type of the occupying signals.

Figure 8:
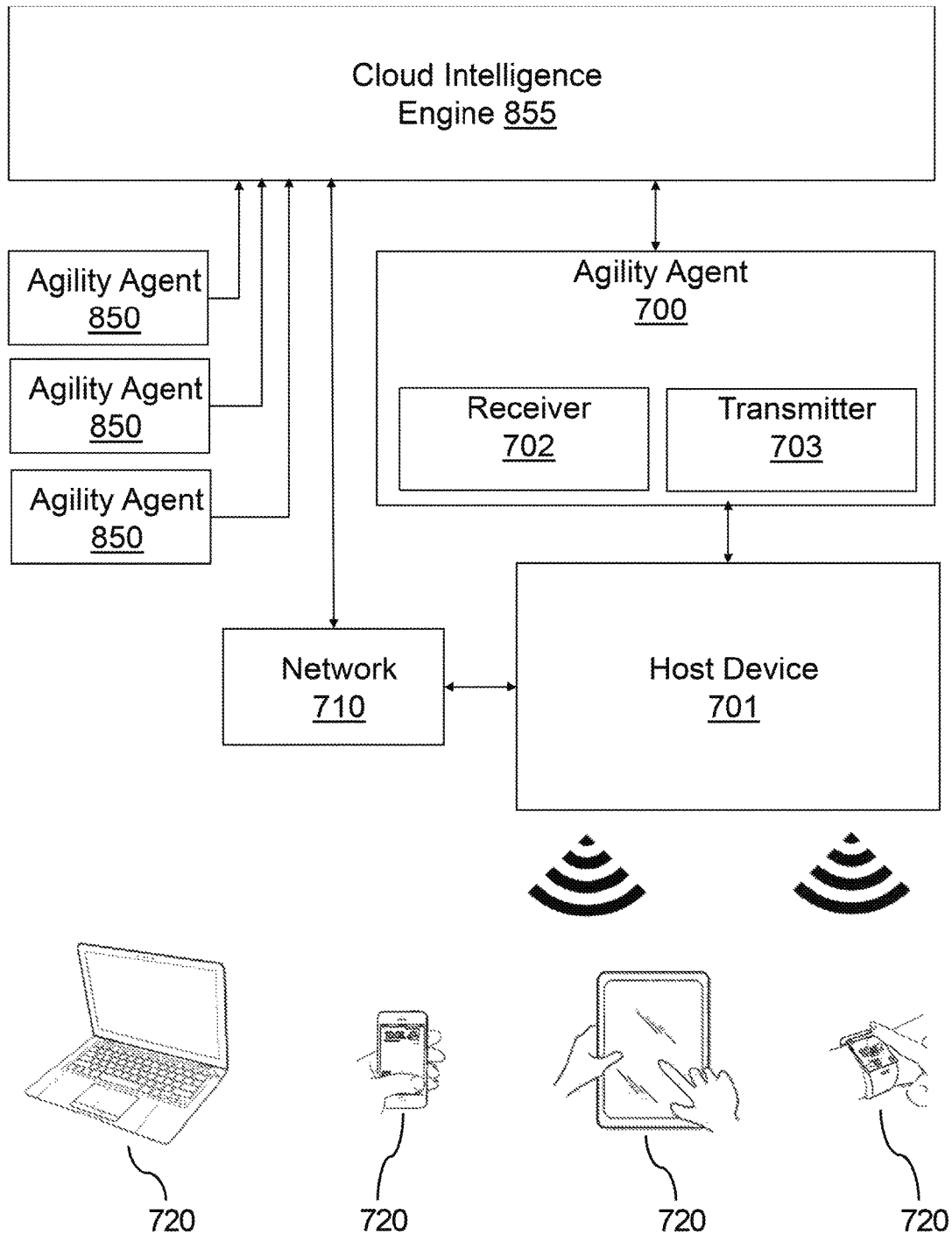
FIG. 8 illustrates another embodiment of the present invention in which the agility agent is connected to a host device and connected to a network and a cloud intelligence engine via the host device.

As shown in FIG. 8, in some embodiments, the agility agent 700 is connected to a cloud-based intelligence engine 855. The agility agent 700 may connect to the cloud intelligence engine 855 directly or through the host device 701 and network 710. The cloud intelligence engine 855 integrates time distributed information from the agility agent 700 and combines information from a plurality of other agility agents 850 distributed in space and connected to the cloud intelligence engine 855. The agility agent 700 is programmed to receive control and coordination signals and authorized and preferred channel selection guidance information from the cloud intelligence engine 755.

Figure 9:
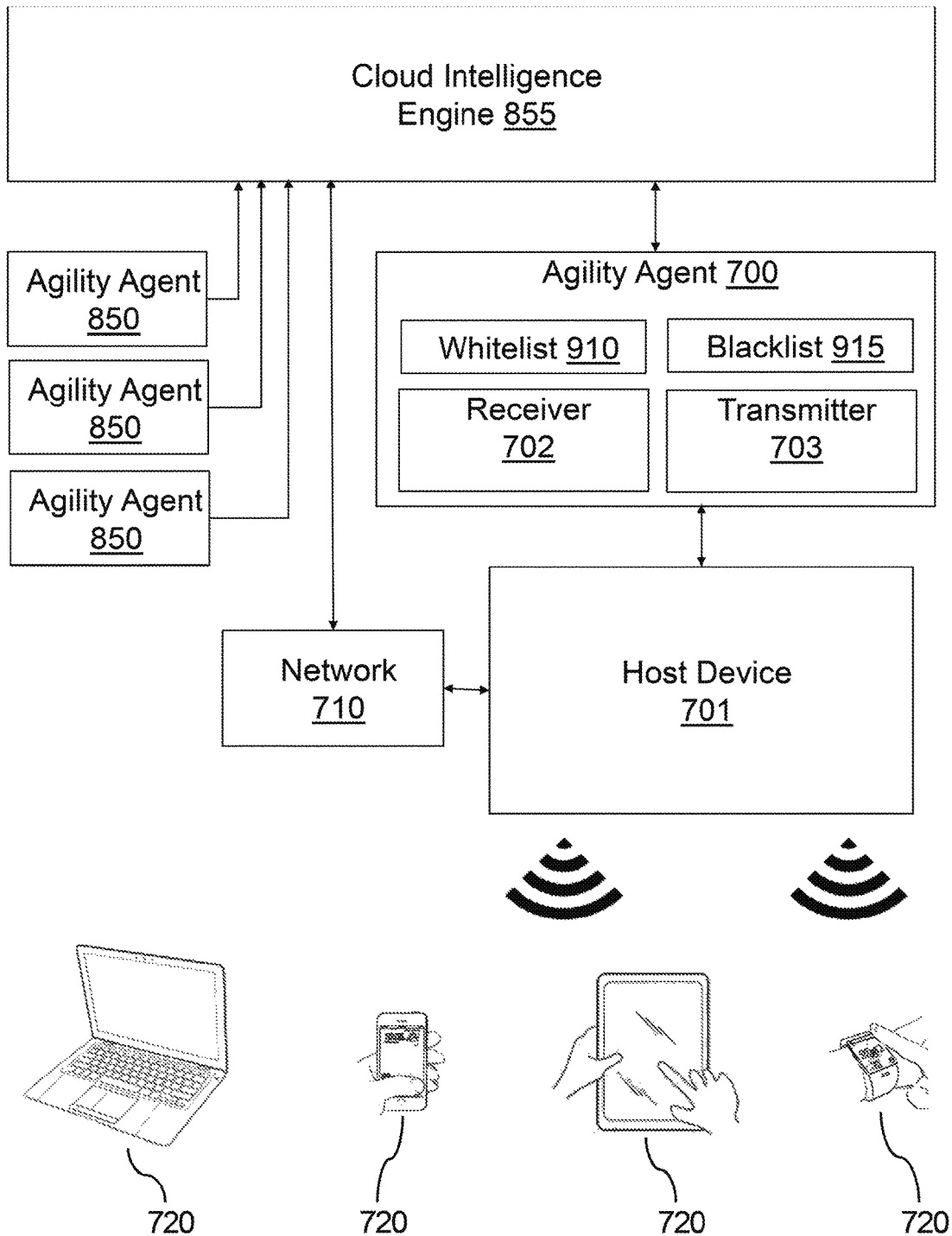
FIG. 9 illustrates another embodiment of the present invention in which the agility agent is connected to a host device and connected to a network and a cloud intelligence engine via the host device.

In another embodiment shown in FIG. 9, the present invention includes a system and method for selecting available channels free of occupying signals from a plurality of radio frequency channels in which an agility agent 700 functioning as an autonomous frequency selection master includes an embedded radio receiver 702 to detect the occupying signals in each of the plurality of radio frequency channels and an embedded radio transmitter 703 to indicate the available channels and unavailable channels not free of the occupying signals. The agility agent 700 contains a channel whitelist 910 of one or more channels scanned and determined not to contain an occupying signal. The agility agent 700 may receive the whitelist 910 from another device including a cloud intelligence engine 855. Or the agility agent 700 may have previously derived the whitelist 910 through a continuous CAC for one or more channels. In this embodiment, the agility agent 700 is programmed to cause the embedded radio receiver 702 to scan each of the plurality of radio frequency channels non-continuously interspersed with periodic switching to the channels in the channel whitelist 910 to perform a quick occupying signal scan in each channel in the channel whitelist 910. The agility agent 700 is further programmed to cause the embedded radio transmitter 703 to transmit a first beacon transmission in each channel in the channel whitelist 910 during the quick occupying signal scan and to track in the channel whitelist 910 the channels scanned and determined not to contain the occupying signal during the non-continuous scan and the quick occupying signal scan. The agility agent 700 is also programmed to track in a channel blacklist 915 the channels scanned and determined to contain the occupying signal during the non-continuous scan and the quick occupying signal scan and then to perform in-service monitoring for the occupying signal, including transmitting a second beacon for each of the channels in the channel whitelist 910, continuously and sequentially.

Figure 10:
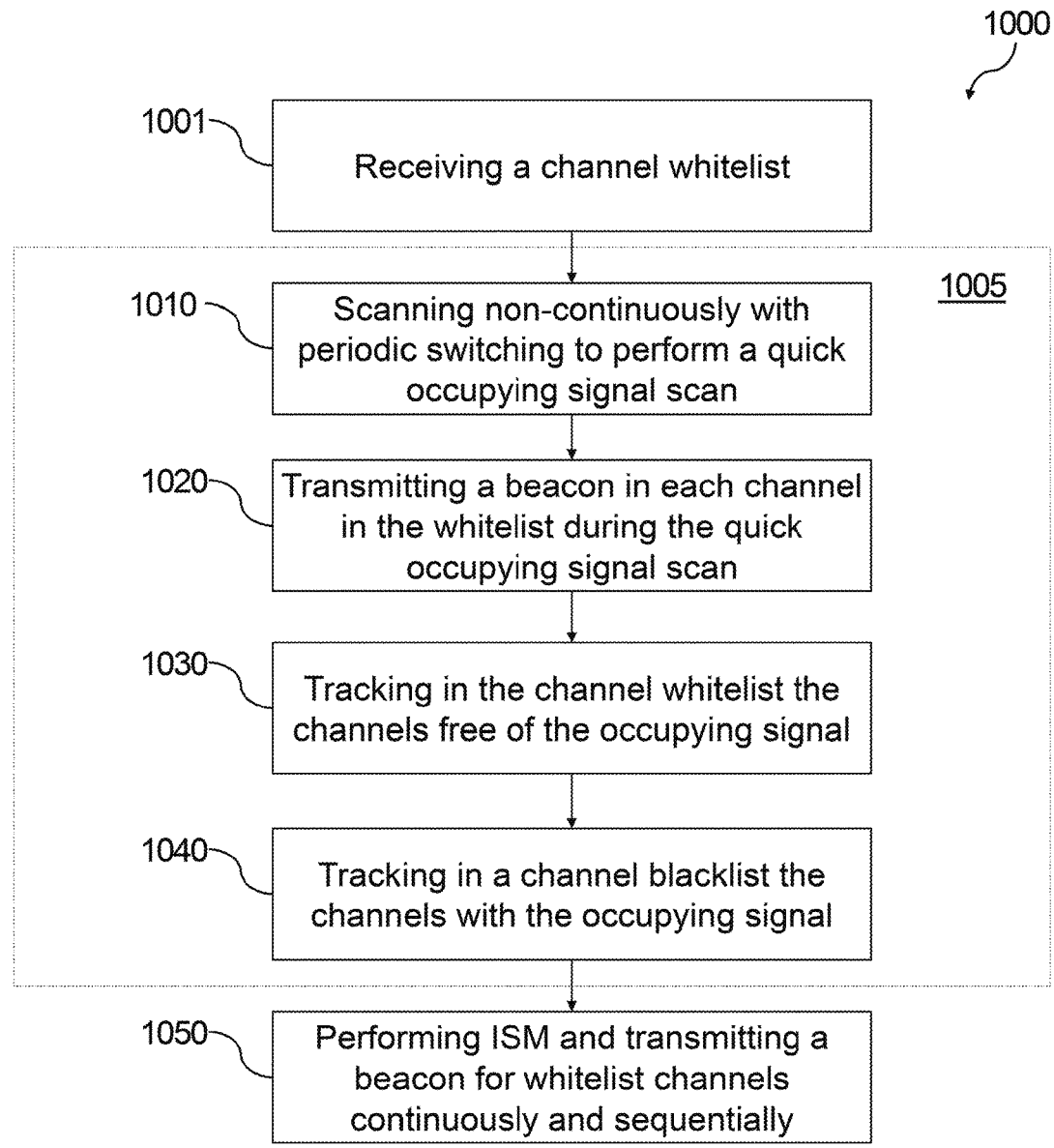
FIG. 10 illustrates a method of performing a channel availability check and in-service monitoring of the present invention.

FIG. 10 illustrates an exemplary method 1000 according to the present invention for selecting an operating channel from a plurality of radio frequency channels in an agility agent functioning as an autonomous frequency selection master. The method includes receiving a channel whitelist of one or more channels scanned and determined not to contain an occupying signal 1010. Next, the agility agent performs a channel availability check 1005 for the plurality of radio frequency channels in a time-division manner. The time-division channel availability check includes scanning 1010 with an embedded radio receiver in the agility agent each of the plurality of radio frequency channels non-continuously interspersed with periodic switching to the channels in the channel whitelist to perform a quick occupying signal scan and transmitting 1020 a first beacon with an embedded radio transmitter in the agility agent in each channel in the channel whitelist during the quick occupying signal scan. The agility agent also tracks 1030 in the channel whitelist the channels scanned in step 1010 and determined not to contain the occupying signal and tracks 1040 in a channel blacklist the channels scanned in step 1010 and determined to contain the occupying signal. Finally, the agility agent performs in-service monitoring for the occupying signal and a second beaconing transmission for each of the channels in the channel whitelist continuously and sequentially 1050.

Figure 11:
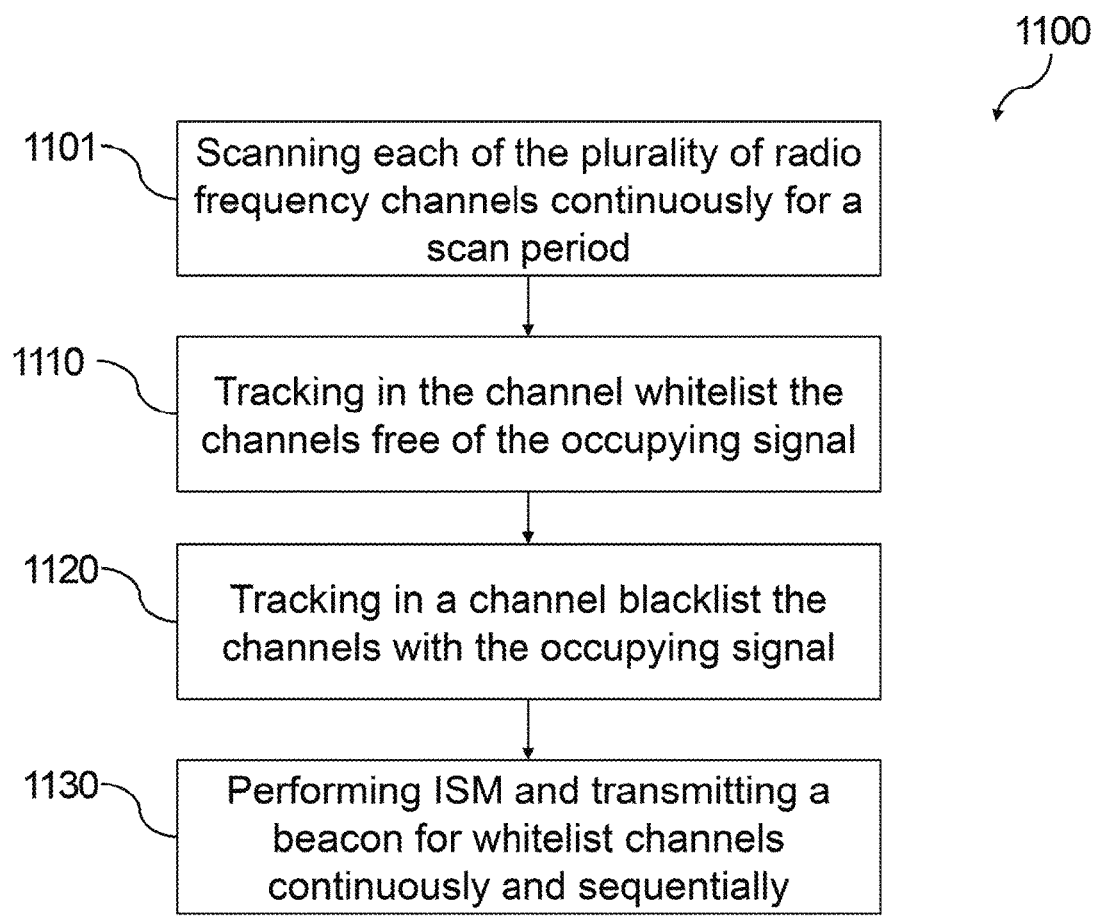
FIG. 11 illustrates another method of performing a channel availability check and in-service monitoring of the present invention.

FIG. 11 illustrates another exemplary method 1100 for selecting an operating channel from a plurality of radio frequency channels in an agility agent functioning as an autonomous frequency selection master. The method 1100 includes performing a channel availability check for each of the plurality of radio frequency channels by scanning 1101 with an embedded radio receiver in the agility agent each of the plurality of radio frequency channels continuously for a scan period. The agility agent then tracks 1110 in a channel whitelist the channels scanned and determined not to contain an occupying signal and tracks 1120 in a channel blacklist the channels scanned and determined to contain the occupying signal. Then the agility agent performs in-service monitoring for the occupying signal and transmits a beacon with an embedded radio transmitter in the agility agent for each of the channels in the channel whitelist continuously and sequentially 1130.

Figure 12:
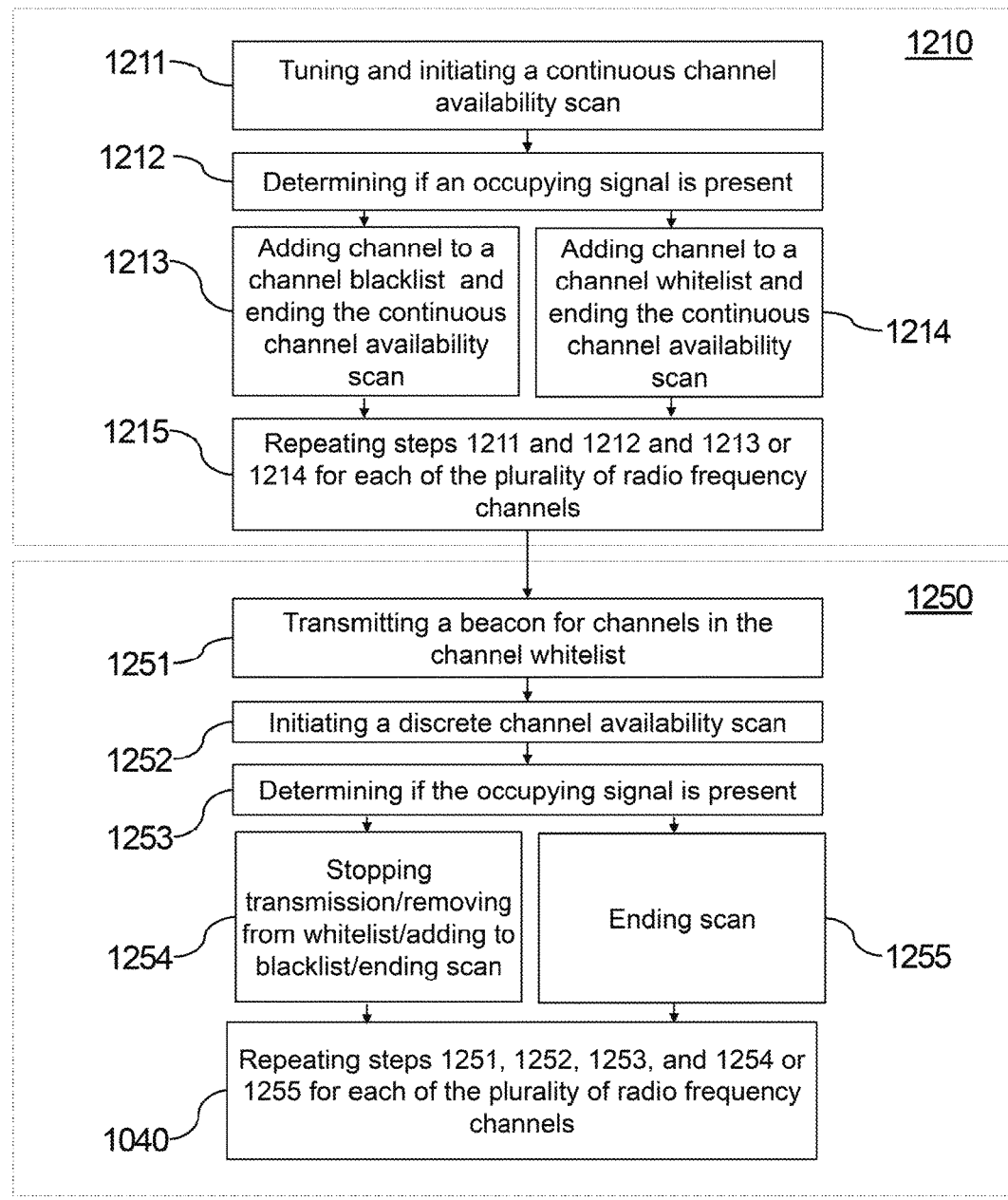
FIG. 12 illustrates another method of performing a channel availability check and in-service monitoring of the present invention.

FIG. 12 illustrates a further exemplary method 1200 for selecting an operating channel from a plurality of radio frequency channels in an agility agent functioning as an autonomous frequency selection master. The method 1200 includes performing a channel availability check 1210 for each of the plurality of radio frequency channels and performing in-service monitoring and beaconing 1250 for each of the plurality of radio frequency channels. The channel availability check 1210 includes tuning an embedded radio receiver in the autonomous frequency selection master device to one of the plurality of radio frequency channels and initiating a continuous channel availability scan in the one of the plurality of radio frequency channels with the embedded radio receiver 1211. Next, the channel availability check 1210 includes determining if an occupying signal is present in the one of the plurality of radio frequency channels during the continuous channel availability scan 1212. If the occupying signal is present in the one of the plurality of radio frequency channels during the continuous channel availability scan, the channel availability check 1210 includes adding the one of the plurality of radio frequency channels to a channel blacklist and ending the continuous channel availability scan 1213. If the occupying signal is not present in the one of the plurality of radio frequency channels during the continuous channel availability scan during a first scan period, the channel availability check 1210 includes adding the one of the plurality of radio frequency channels to a channel whitelist and ending the continuous channel availability scan 1214. Next, the channel availability check 1210 includes repeating steps 1211 and 1212 and either 1213 or 1214 for each of the plurality of radio frequency channels.

The in-service monitoring and beaconing 1250 for each of the plurality of radio frequency channels includes determining if the one of the plurality of radio frequency channels is in the channel whitelist and if so, tuning the embedded radio receiver in the autonomous frequency selection master device to the one of the plurality of radio frequency channels and transmitting a beacon in the one of the plurality of radio frequency channels with an embedded radio transmitter in the autonomous frequency selection master device 1251. Next, the in-service monitoring and beaconing 1250 includes initiating a discrete channel availability scan (a quick scan as described previously) in the one of the plurality of radio frequency channels with the embedded radio receiver 1252. Next, the in-service monitoring and beaconing 1250 includes determining if the occupying signal is present in the one of the plurality of radio frequency channels during the discrete channel availability scan 1253. If the occupying signal is present, the in-service monitoring and beaconing 1250 includes stopping transmission of the beacon, removing the one of the plurality of radio frequency channels from the channel whitelist, adding the one of the plurality of radio frequency channels to the channel blacklist, and ending the discrete channel availability scan 1254. If the occupying signal is not present in the one of the plurality of radio frequency channels during the discrete channel availability scan for a second scan period, the in-service monitoring and beaconing 1250 includes ending the discrete channel availability scan 1255. Thereafter, the in-service monitoring and beaconing 1250 includes repeating steps 1251, 1252, and 1253 as well as either 1254 or 1255 for each of the plurality of radio frequency channels.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a radar detector that performs a first scan for radar in respective 5 GHz radio channels of a plurality of 5 GHz radio channels; and
a 5 GHz radio transceiver that occupies one or more available 5 GHz radio channels of the plurality of 5 GHz radio channels on which radar was not detected by the radar detector by indicating to a client device that data transmission is available on the one or more available 5 GHz radio channels, wherein the 5 GHz radio transceiver occupies the one or more available 5 GHz radio channels during a transmission duty cycle and a radar detection duty cycle, wherein the transmission duty cycle is a time period during which a specific 5 GHz radio channel of the one or more available 5 GHz radio channels is unoccupied, which is less than or equal to a maximum time period allowable for the client device to remain associated with the specific 5 GHz channel, and wherein the radar detection duty cycle is the time period between successive radar scans, by the radar detector, on the specific 5 GHz channel.

2. The device of claim 1, wherein
the radar detector performs a second scan for radar in the respective 5 GHz radio channels of the plurality of 5 GHz radio channels, and
the 5 GHz radio transceiver occupies one or more available 5 GHz radio channels of the plurality of 5 GHz radio channels on which radar was not detected by the radar detector during the second scan.

3. The device of claim 1, wherein the device is a standalone wireless device.

4. The device of claim 3, wherein the standalone wireless device is incorporated into an access point device.

5. The device of claim 1, further comprising: the device is one of an integrated circuit chip, a printed circuit board or a semiconductor package.

6. The device of claim 1, further comprising: the radar detector includes one or more radios and the device is an integrated circuit chip.

7. The device of claim 1, wherein the device is a standalone multi-channel Dynamic Frequency Selection (DFS) master and further comprises a non-DFS radio transceiver programmed to communicate a whitelist and a blacklist of 5 GHz channels to the client device.

8. The device of claim 7, wherein the non-DFS radio transceiver is selected from a group consisting of a 2.4 GHz radio transceiver, a Bluetooth transceiver, and an 802.15.4 transceiver.

9. A method comprising;
scanning a plurality of 5 GHz radio channels for radar;
determining one or more 5 GHz radio channels of the plurality of 5 GHz radio channels are available based on radar not being detected during the scanning; and
occupying the one or more 5 GHz radio channels during a transmission duty cycle and a radar detection duty cycle by indicating to a client device that data transmission is available on the one or more available 5 GHz radio channels,
wherein the transmission duty cycle is a time period during which a specific 5 GHz radio channel of the one or more available 5 GHz radio channels is unoccupied, which is less than or equal to a maximum time period allowable for the client device to remain associated with the specific 5 GHz channel,
and wherein the radar detection duty cycle is the time period between successive radar scans on the specific 5 GHz channel.

10. The method of claim 9, wherein the scanning is a first scanning and the occupying is a first occupying, the method further comprising:
performing a second scanning for radar in the respective 5 GHz radio channels of the plurality of 5 GHz radio channels, and
performing a second occupying of one or more available 5 GHz radio channels of the plurality of 5 GHz radio channels on which radar was not detected during the performing the second scanning.

11. The method of claim 9, wherein the method is implemented in a standalone wireless device.

12. The method of claim 11, wherein the standalone wireless device is incorporated into an access point device.

13. The method of claim 9, further comprising:
storing, in a memory device, a whitelist that comprises a first list of the one or more available 5 GHz radio channels; and
storing, in the memory device, a blacklist that comprises a second list of other 5 GHz radio channels of the plurality of 5 GHz radio channels on which radar was detected by the 5 GHz radio transceiver.

14. The method of claim 13, wherein the whitelist comprises a time-stamp signal that indicates a defined period during which the whitelist is valid, and wherein use of the whitelist by the client device is disabled after the defined period.

15. The method of claim 14, wherein the method is implemented on a standalone multi-channel Dynamic Frequency Selection (DFS) master and further comprises:
communicating the whitelist and the blacklist to the client device.

16. A standalone multi-channel dynamic frequency selection master, comprising:
a radar detector that performs a first scan for radar in respective 5 GHz radio channels of a plurality of 5 GHz radio channels; and
a 5 GHz radio transceiver that occupies a first 5 GHz radio channel of the plurality of 5 GHz radio channels on which radar was not detected by the radar detector, wherein the 5 GHz radio transceiver occupies the first 5 GHz radio channel during a transmission duty cycle and a radar detection duty cycle by indicating to a client device that data transmission is available on the one or more available 5 GHz radio channels,
wherein the transmission duty cycle is a time period during which the first 5 GHz radio channel is unoccupied, which is less than or equal to a maximum time period allowable for the client device to remain associated with the first 5 GHz channel, and
wherein the radar detection duty cycle is the time period between successive radar scans on the first 5 GHz channel by the radar detector.

17. The standalone multi-channel dynamic frequency selection master of claim 16, wherein
the radar detector performs a second scan for radar in the plurality of 5 GHz radio channels, excluding the first 5 GHz radio channel, and
the 5 GHz radio transceiver occupies a second 5 GHz radio channel of the plurality of 5 GHz radio channels on which radar was not detected by the radar detector during the second scan.

18. The standalone multi-channel dynamic frequency selection master of claim 16, wherein to occupy the first 5 GHz radio channel, the 5 GHz radio transceiver provides availability indications for the first 5 GHz radio channel.

19. The standalone multi-channel dynamic frequency selection master of claim 18, wherein the availability indications are transmitted during the transmission duty cycle and the radar detection duty cycle.

20. The standalone multi-channel dynamic frequency selection master of claim 16 is incorporated in a wireless access point.

* * * * *